(12) United States Patent
Sato et al.

(10) Patent No.: US 8,744,656 B2
(45) Date of Patent: Jun. 3, 2014

(54) RUNNING CONTROL DEVICE FOR ELECTRIC VEHICLE

(75) Inventors: Shinya Sato, Hitachinaka (JP); Naoyuki Tashiro, Atsugi (JP); Kentaro Maki, Ushiku (JP); Atsushi Yokoyama, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 13/296,777

(22) Filed: Nov. 15, 2011

(65) Prior Publication Data

US 2012/0123624 A1    May 17, 2012

(30) Foreign Application Priority Data

Nov. 16, 2010 (JP) ................................. 2010-255694

(51) Int. Cl.
*B60L 11/00* (2006.01)

(52) U.S. Cl.
USPC .......................................................... 701/22

(58) Field of Classification Search
CPC ..... B60W 10/08; B60W 20/00; B60W 10/06; B60W 2710/83; B60W 20/40; B60W 2510/0657; B60W 2510/083; B60W 2600/00; B60W 2710/0666; B60W 30/188; B60W 2510/08; B60W 2530/18; B60W 30/18072; Y02T 10/6286; Y02T 10/642; Y02T 10/7283; Y02T 10/7258; Y02T 10/644; Y02T 10/48; Y02T 10/52; Y02T 10/56; B60L 2240/423; B60L 11/1803; B60L 15/20; B60L 11/00; B60L 11/1805; B60L 2240/443

USPC ............. 701/1, 22, 93, 94, 96, 99, 100, 101, 701/102, 112, 123; 318/59, 61, 62, 268, 318/272, 275, 276, 277, 162, 163, 430, 431, 318/432, 434

See application file for complete search history.

(56) References Cited

FOREIGN PATENT DOCUMENTS

| JP | 7-131994 A | 5/1995 |
|---|---|---|
| JP | 11-18207 A | 1/1999 |
| JP | 2010-6309 A | 1/2010 |
| JP | 2010-120503 A | 6/2010 |

*Primary Examiner* — Helal A Algahaim
*Assistant Examiner* — Genna Mott
(74) *Attorney, Agent, or Firm* — Crowell & Moring LLP

(57) ABSTRACT

A running control device for an electric vehicle includes: a first calculation unit that calculates a predetermined reference torque required for braking/driving the motor that provides a beneficial effect with regard to power consumption of the electric vehicle; a second calculation unit that calculates interval allocation between a first interval in which the electric vehicle is propelled by braking/driving the motor at the predetermined reference torque and a second interval in which the electric vehicle is coasted without the motor being braked or driven; a third calculation unit that calculates a control requested torque for braking/driving the motor intermittently, so as alternatingly to repeat running of the electric vehicle in the first intervals and coasting of the electric vehicle in the second intervals; and a running control unit that performs running control of the electric vehicle by braking/driving the motor intermittently according to the control requested torque.

9 Claims, 21 Drawing Sheets

RUNNING CONTROL DEVICE FOR ELECTRIC VEHICLE

INCORPORATION BY REFERENCE

The disclosure of the following priority application is herein incorporated by reference: Japanese Patent Application No. 2010-255694, filed Nov. 16, 2010.

BACKGROUND OF THE INVENTION

1. Field of the Invention

The present invention relates to a running control device for an electric vehicle.

2. Description of Related Art

In recent years attention is being directed to electric automobiles, since they are vehicles that impose a low burden on the environment. However, the batteries that are used in electric automobiles have the shortcoming that their specific energy densities are low compared with gasoline, so that the range of electric automobiles is short as compared with the range of gasoline automobiles. As a means of reducing the consumption of electrical power (hereinafter termed "power consumption"), a technique is per se known of reducing the operating time of the motor by mixing inertial running into the running control, thus utilizing inertial energy effectively. For example, in Japanese Laid-Open Patent Publication 2010-120503, a method of running control is disclosed in which appropriate upper and lower limit values are provided for target vehicle speed during constant speed running, and in which acceleration and coasting are repeated so as to maintain a state in which the actual vehicle speed is kept between these upper and lower target vehicle speed limit values.

SUMMARY OF THE INVENTION

According to this running control technique disclosed in Japanese Laid-Open Patent Publication 2010-120503 in which acceleration and coasting are repeated, there is a problem with regard to insufficient reduction of power consumption, since no consideration is paid to energy efficiency during acceleration.

According to the first aspect of the present invention, a running control device for an electric vehicle comprises: a first calculation unit that, based upon vehicle running parameters of the electric vehicle and a drive state, related to power running and regeneration, of a motor of the electric vehicle, calculates a predetermined reference torque required for braking/driving the motor that provides a beneficial effect with regard to power consumption of the electric vehicle; a second calculation unit that, based upon the vehicle running parameters, calculates interval allocation between a first interval in which the electric vehicle is propelled by braking/driving the motor at the predetermined reference torque and a second interval in which the electric vehicle is coasted without the motor being braked or driven; a third calculation unit that calculates a control requested torque for braking/driving the motor intermittently based upon the predetermined reference torque and the interval allocation, so as alternatingly to repeat running of the electric vehicle in the first intervals and coasting of the electric vehicle in the second intervals; and a running control unit that performs running control of the electric vehicle by braking/driving the motor intermittently according to the control requested torque.

According to the second aspect of the present invention, in the running control device for the electric vehicle according to the first aspect, it is preferred that the vehicle running parameters include an actual speed of the electric vehicle.

According to the third aspect of the present invention, in the running control device for the electric vehicle according to the first aspect, it is preferred that the predetermined reference torque is included in a maximum efficiency torque neighborhood that corresponds to a maximum efficiency of the motor.

According to the fourth aspect of the present invention, in the running control device for the electric vehicle according to the first aspect, it is preferred that the running control device further comprises a fourth calculation unit that, based upon the vehicle running parameters, calculates a requested basic torque for continuously braking/driving the motor. The second calculation unit acquires the requested basic torque calculated by the fourth calculation unit, acquires the predetermined reference torque calculated by the first calculation unit, and calculates the interval allocation based upon the requested basic torque and the predetermined reference torque.

According to the fifth aspect of the present invention, in the running control device for the electric vehicle according to the fourth aspect, it is preferred that the interval allocation corresponds to a ratio between the first interval and the second interval; and the ratio between the first interval and the second interval is determined based upon a ratio between the requested basic torque and the predetermined reference torque.

According to the sixth aspect of the present invention, in the running control device for the electric vehicle according to the fourth aspect, it is preferred that an absolute value of the predetermined reference torque is a higher torque value than an absolute value of the requested basic torque; and a motor efficiency when braking/driving the motor with the predetermined reference torque is higher than a motor efficiency when braking/driving the motor with the requested basic torque.

According to the seventh aspect of the present invention, in the running control device for the electric vehicle according to the first aspect, it is preferred that the period at which the first interval and the second interval are repeated cyclically is less than or equal to 500 ms.

According to the eighth aspect of the present invention, in the running control device for the electric vehicle according to the first aspect, it is preferred that the second calculation unit acquires a target vehicle speed for the electric vehicle and the actual vehicle speed as the vehicle running parameters, and calculates the interval allocation based upon the target vehicle speed and the actual vehicle speed.

According to the ninth aspect of the present invention, in the running control device for the electric vehicle according to the eighth aspect, it is preferred that the second calculation unit acquires the target vehicle speed based upon the actual vehicle speed, an amount of depression of an accelerator pedal of the electric vehicle, a weight of the electric vehicle, and a resistance while the electric vehicle is running.

According to the tenth aspect of the present invention, in the running control device for the electric vehicle according to the first aspect, it is preferred that the running control unit performs one of the running control by braking/driving the motor intermittently according to the control requested torque and the running control by braking/driving the motor continuously based upon the vehicle running parameters, according to an intention of a driver of the electric vehicle or according to a state of operation of the electric vehicle by the driver.

According to the eleventh aspect of the present invention, in the running control device for the electric vehicle according to claim 10, the tenth aspect, it is preferred that the intention includes at least one of a torque requested for braking/driving the motor, switch input for selecting one of eco mode and power mode, and accelerator pedal depression amount; and the state of operation includes at least one of the predetermined reference torque, an actual speed of the electric vehicle, and battery SOC.

According to the twelfth aspect of the present invention, in the running control device for the electric vehicle according to the first aspect, it is preferred that the third calculation unit implements at least one of ramp processing, sine wave processing, and flattening processing upon the control requested torque.

DESCRIPTION OF THE PREFERRED EMBODIMENTS

Figure 1:
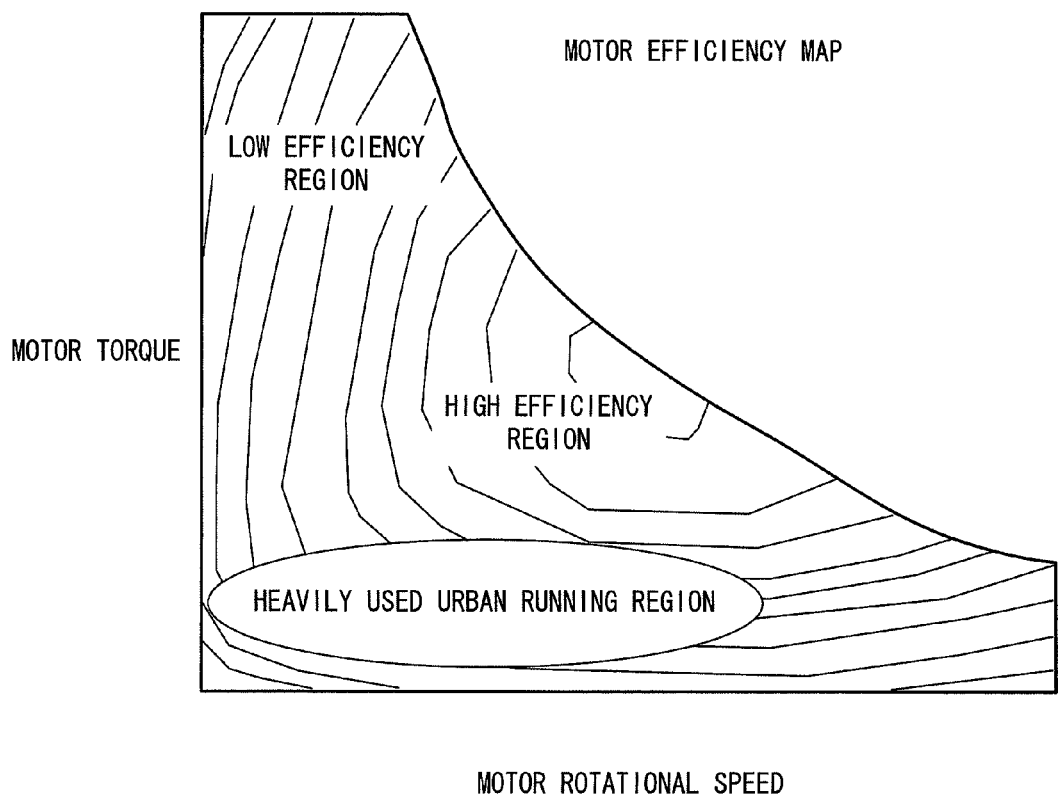
FIG. 1 is a figure showing the motor efficiency distribution of an electric vehicle, and a region heavily used for running within this motor efficiency distribution.
Figure 2:
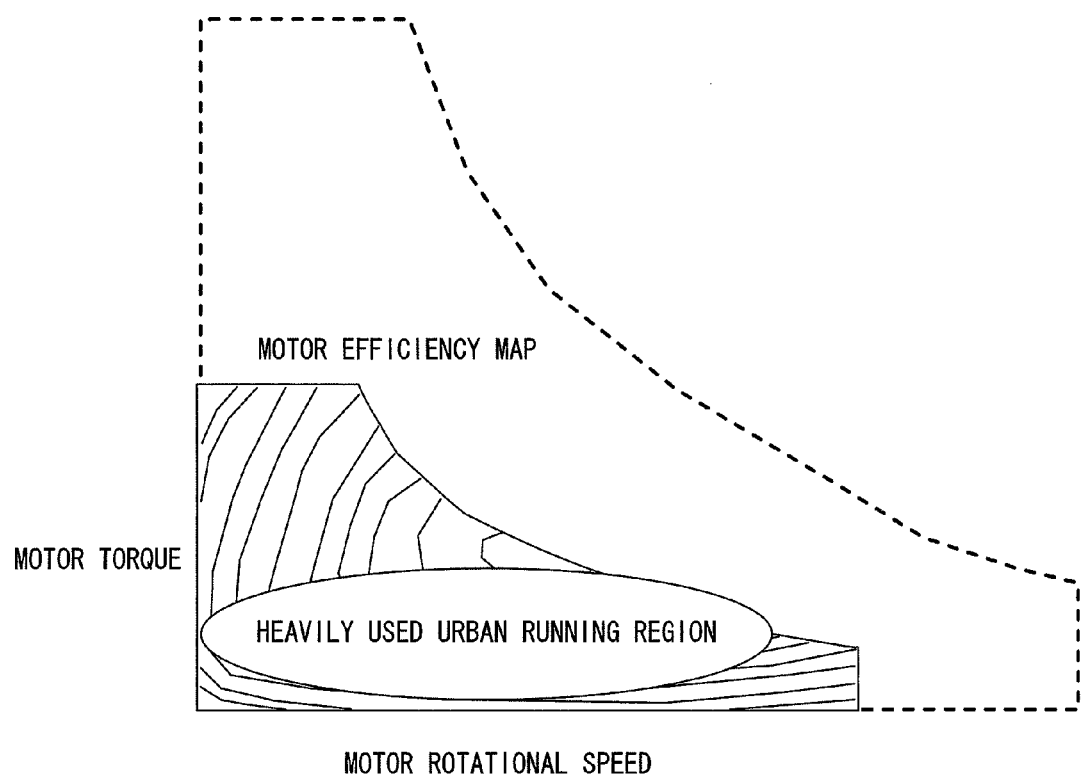
FIG. 2 is a figure showing the motor efficiency distribution when the motor is made more compact, and a region heavily used for running within this motor efficiency distribution.

While, in order to extend the range of an electric automobile, it is effective to enhance the drive efficiency of the motor, actually, as shown in FIG. 1, it is often the case that the high efficiency operational region of the motor for the electric automobile and the operational region that is often used in urban running and the like do not coincide with one another. When design is implemented to match the high efficiency region of the motor to the heavily used urban running region as shown in FIG. 2, there is a tendency for the physical structure of the motor to become small. In this case, while a satisfactory level of electrical power consumption (hereinafter termed "power consumption") during urban running is attained, there is a shortage of output in a high load condition such as during high speed running or overtaking or the like. Accordingly the physical structure for a motor for an electric automobile must be set to match the running conditions during high load, and thus motor efficiency during urban running comes to be sacrificed.

In Japanese Laid-Open Patent Publication H11-18207, for example, a technique is disclosed in which a transmission is provided between the motor and the wheel axle, and the speed change ratio via the transmission is controlled according to the running state, so that the operation point of the motor is brought close to the high efficiency region. And in Japanese Laid-Open Patent Publication H7-131994 a technique is described in which a plurality of motors are mounted to the vehicle, and the allocation of load to these motors is optimized so that the overall total efficiency becomes optimal. However, with these prior art techniques disclosed in Japanese Laid-Open Patent Publication H11-18207 and in Japanese Laid-Open Patent Publication H7-131994, new devices are added into the drive system, and this invites increase of weight and increase of cost.

While a running control technique in which acceleration and coasting are repeated is described in Japanese Laid-Open Patent Publication 2010-120503, there is no disclosure related to the operational region of the motor during acceleration. Accordingly, in this running control technique in which acceleration and coasting are repeated, there is scope for improvement of the motor drive efficiency. This prior art technique described in Japanese Laid-Open Patent Publication 2010-120503 can only be applied during constant speed running, but cannot be applied during normal running in which the accelerator pedal is being actuated by the driver.

In other words, in these prior art documents, no running control device for an electric vehicle such as a low power consumption electric automobile or the like is disclosed that can deal with running due to operation of the accelerator pedal, and that moreover pays attention to driving the motor at high efficiency.

Figure 3A:
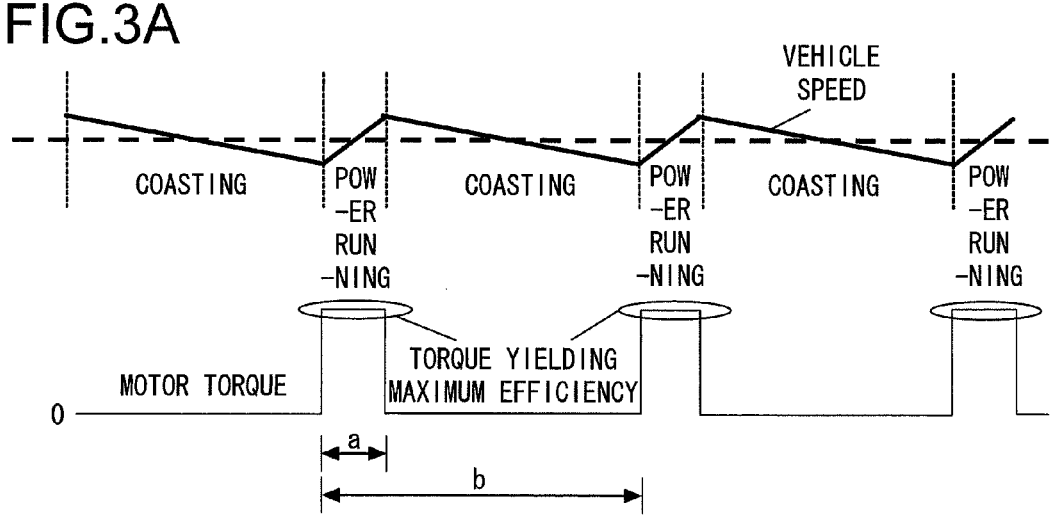
FIGS. 3A, 3B, and 3C are figures showing the theory of high efficiency running control.
Figure 3B:
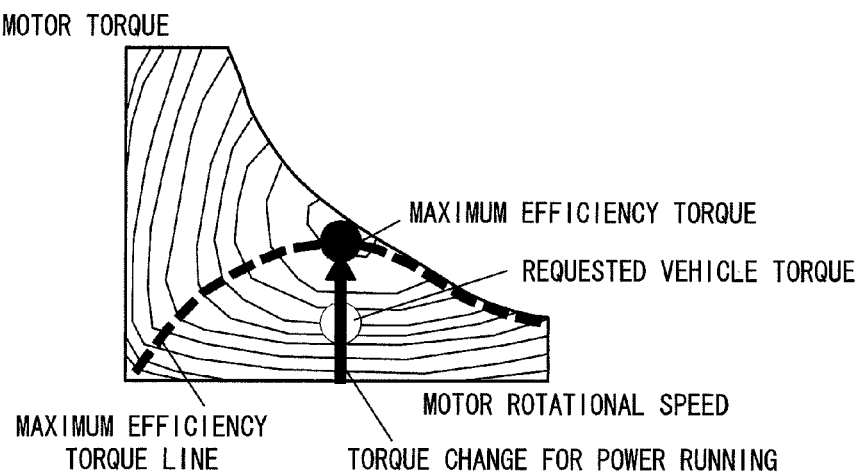
Figure 3C:
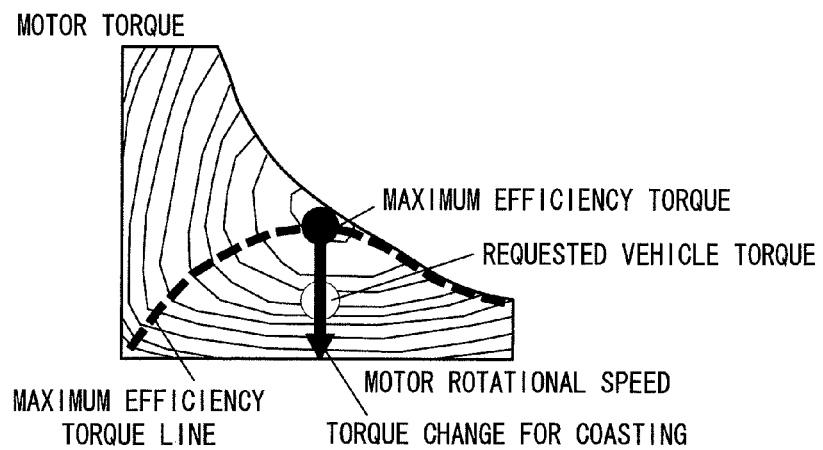

Thus, with the running control device according to the present invention, as shown in FIGS. 3A, 3B, and 3C, pulse type torque control is performed in which a torque that yields maximum efficiency is desirably set in advance for each motor rotational speed, and running under propulsion by the motor (power running) with this maximum efficiency torque and inertial running with motor propulsion stopped (coasting) are repeated cyclically. Thus the motor is driven intermittently. The allocation of intervals for the pulse width a and the pulse period b shown in FIG. 3A, in other words the pulse duty ratio for such pulse type torque control, is desirably determined using Equation (1).

$$\text{pulse duty ratio} = \text{requested vehicle motor torque} \div \text{maximum efficiency torque} \quad (1)$$

FIG. 3B is a figure showing the change of the motor torque upon change from the coasting section to the power running section shown in FIG. 3A. The motor torque at this time exceeds the requested vehicle torque at a predetermined motor rotational speed, and it is desirable for the motor torque to change to the maximum efficiency torque upon a maximum efficiency torque line. This maximum efficiency torque line shows that the maximum efficiency torque changes according to the motor rotational speed. And FIG. 3C is a figure showing the change of the motor torque upon change from the power running section to the coasting section shown in FIG. 3A. The motor torque at this time drops below the requested vehicle torque at a predetermined motor rotational speed, and it is desirable for it to change to a torque value of zero.

Figure 4:
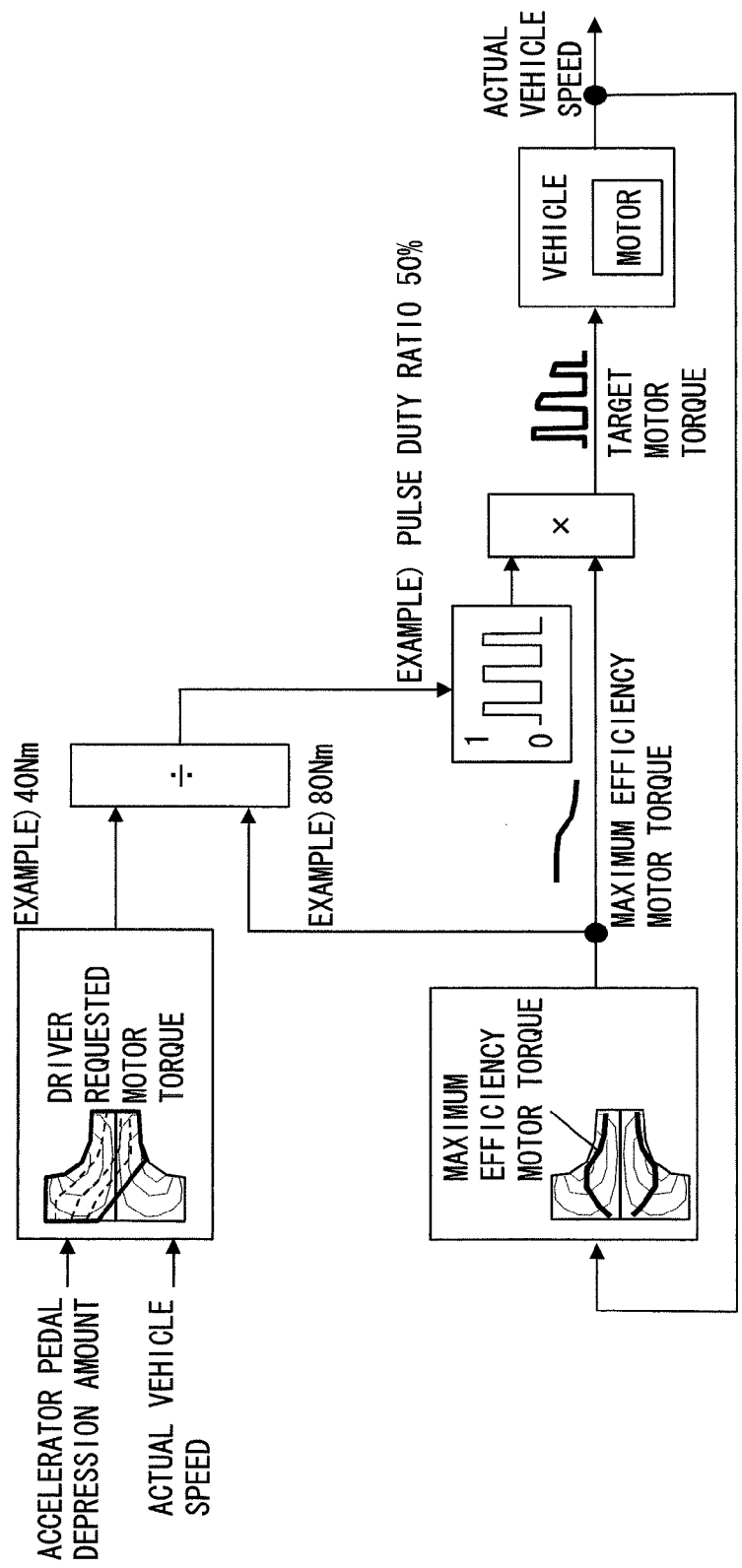
FIG. 4 is a figure showing details of control for high efficiency running.

FIG. 4 is a figure showing the details of control for high efficiency running. When the requested vehicle motor torque that is determined according to the accelerator pedal depression amount and the actual vehicle speed (i.e. the driver requested motor torque) is for example 40 Nm and the maximum efficiency motor torque is for example 80 Nm, then the pulse duty ratio according to the calculation using Equation (1) is determined as being 50%. The maximum efficiency motor torque changes according to the motor rotational speed, as described above. The target motor torque is obtained by multiplying together the maximum efficiency motor torque that changes according to the motor rotational speed, and the pulse duty ratio. The actual vehicle speed is obtained by driving the motor of the vehicle intermittently at this target motor torque, and the maximum efficiency motor torque corresponding to the motor rotational speed at this time is used for a next time in the calculation for determining the pulse duty ratio.

With the running control device according to the present invention, as shown in FIG. 4, since the effective output of the drive motor is adjusted with the pulse duty ratio, accordingly it is possible, for example, to use only the maximum efficiency torque, irrespective of the running load when the motor is intermittently driven. Accordingly, as compared to the continuous motor drive control of the prior art, reduction of the consumption of electrical power by the motor may be anticipated, and it is possible to anticipate great beneficial effects for reduction of power consumption (beneficial effects with regard to power consumption) by being able to implement the advantages of increasing the range of the electric vehicle and by being able to reduce the total battery amount that is provided. Since the running control by the running control device according to the present invention can be provided by only changing the control logic without making any changes to the hardware structure of the vehicle system, accordingly it is possible to anticipate excellent performance with regard to cost. And, since the requested vehicle torque is determined in correspondence to actuation of the accelerator pedal, accordingly it is possible to apply the running control device according to the present invention even to running control in which the accelerator pedal is being actuated by the driver.

—First Embodiment—

A braking/driving ECU 102 according to a first embodiment to which the running control device according to the present invention is applied will now be explained in the following. First the system structure of an electric vehicle 101, that is an object of control by the braking/driving ECU 102, will be explained with reference to FIG. 5. The electric vehicle 101 includes the braking/driving ECU 102, to which an accelerator pedal depression amount signal, a braking signal, a vehicle speed signal and so on are inputted, an inverter 103, a motor 104, a deceleration gear 105, a battery 106, a battery ECU 107, and a braking ECU 108, and four drive wheels 3 are also attached thereto.

A signal for a target motor braking/driving torque 207 outputted from the braking/driving ECU 102 is inputted to the inverter 103, and the inverter 103 drives the motor 104 so that it outputs a torque that corresponds to this signal for the target motor braking/driving torque 207. It should be understood that the power for driving the motor 104 is supplied from the battery 106. The battery ECU 107 performs control of charging and discharging of the battery 106 and monitoring for anomalies and so on, and, according to requirements, outputs battery information to the braking/driving ECU 102. And the braking ECU 108 controls braking of the four drive wheels 3 on the basis of a signal for a target braking torque 208 inputted from the braking/driving ECU 102.

Figure 5:
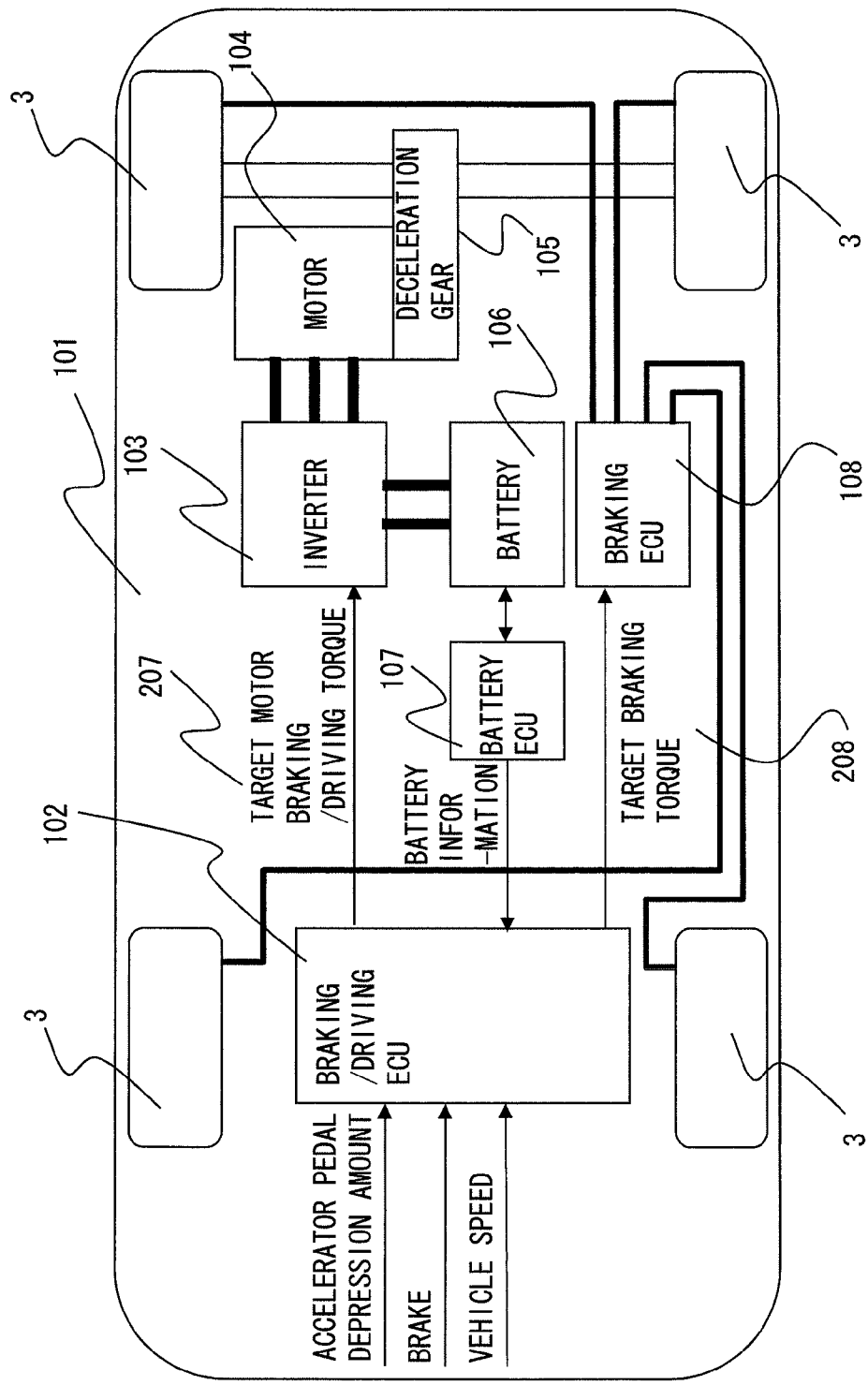
FIG. 5 is a figure showing the system structure of an electric vehicle.
Figure 6:
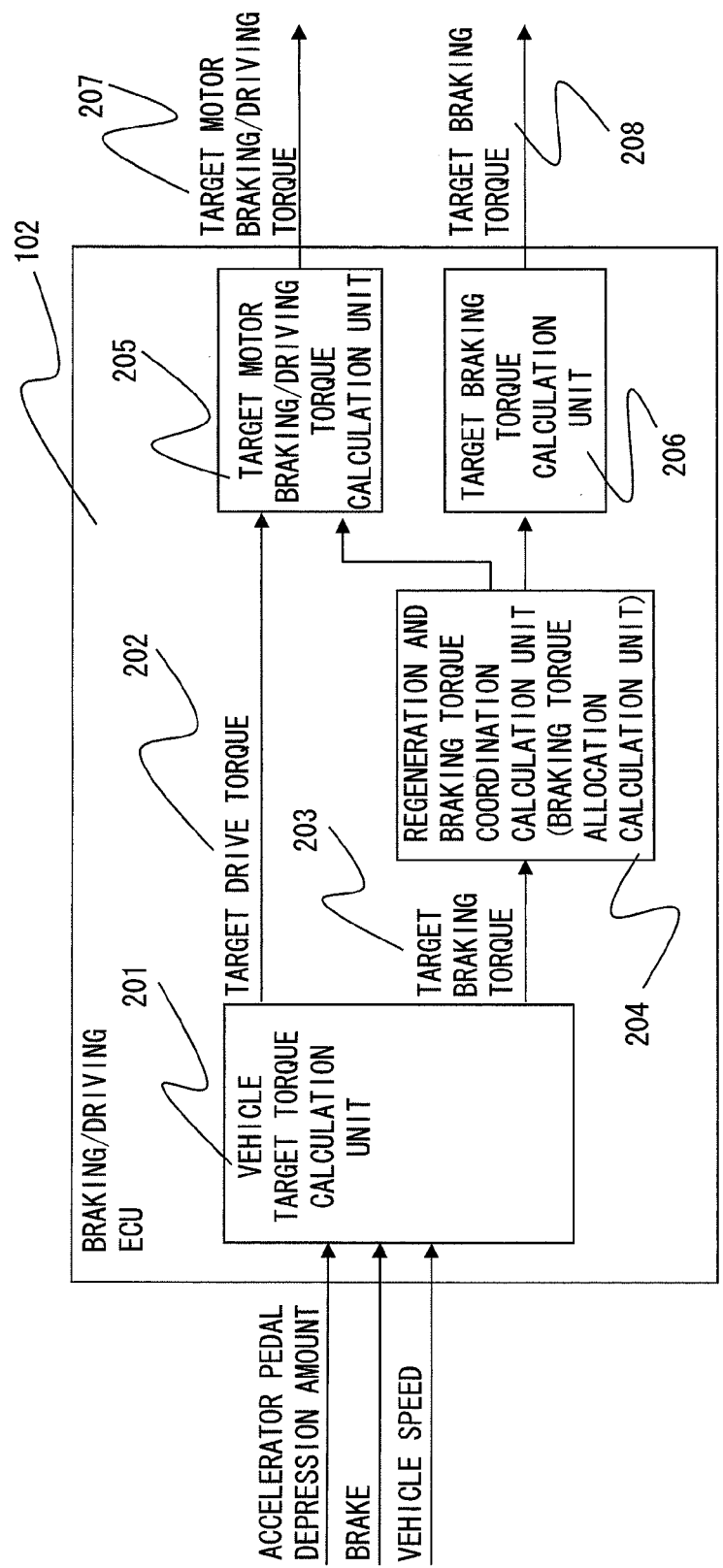
FIG. 6 is a figure showing details of calculation performed by a braking/driving ECU.

FIG. 6 is a figure showing the details of calculation by the braking/driving ECU 102 of FIG. 5. The braking/driving ECU 102 including a CPU is a control device that performs overall control of the electric vehicle 101, and performs predetermined processing according to a predetermined program on the basis of input signals of various types and outputs signals of various types. Among various types of processing for the vehicle as a whole, the braking/driving ECU 102 of this embodiment performs predetermined processing according to a predetermined program on the basis of input signals related to vehicle running parameters such as at least an accelerator pedal depression amount signal, a braking signal, and a vehicle speed signal, and so on, and outputs the signal for the target motor braking/driving torque 207 and the signal for the target braking torque 208.

The accelerator pedal depression amount signal is a signal that corresponds to the amount by which an accelerator pedal (not shown in the figures) is depressed by the driver. And the braking signal is a signal that corresponds to the amount by which a brake pedal (not shown in the figures) is depressed by the driver. Moreover, the vehicle speed signal is a signal from a vehicle speed sensor (not shown in the figures) that detects the rotational speed of the drive wheels 3 or the like, and is a signal that specifies the speed of the electric vehicle 101.

As shown in FIG. 6, the braking/driving ECU 102 includes the vehicle target torque calculation unit 201, the target motor braking/driving torque calculation unit 205, a regeneration and braking torque coordination calculation unit 204 (i.e. a braking torque allocation calculation unit), and a target braking torque calculation unit 206. The vehicle target torque calculation unit 201 calculates a target drive torque 202 on the basis of the accelerator pedal depression amount signal, the braking signal, the vehicle speed signal and so on that are inputted, and outputs a signal for this target drive torque 202 to the target motor braking/driving torque calculation unit 205. Moreover, the vehicle target torque calculation unit 201 calculates a target braking torque 203, and outputs a signal for this target braking torque 203 to the regeneration and braking torque coordination calculation unit 204. The details of the processing by this vehicle target torque calculation unit 201 will be described hereinafter.

On the basis of the target braking torque value that is inputted, the regeneration and braking torque coordination calculation unit 204 performs control for allocation of braking using regeneration by the motor 104 and braking by the mechanical brakes, and outputs a control value for regeneration by the motor 104 to the target motor braking/driving torque calculation unit 205 and also a value for braking control by the mechanical brakes to the target braking torque calculation unit 206. And the target motor braking/driving torque calculation unit 205 outputs the target motor braking/driving torque 207 on the basis of the signal for the target drive torque 202 from the vehicle target torque calculation unit 201 and the motor torque value for regeneration from the regeneration and braking torque coordination calculation unit 204. Moreover, the target braking torque calculation unit 206 calculates and outputs the target braking torque 208 on the basis of the torque value for braking by the mechanical brakes from the regeneration and braking torque coordination calculation unit 204.

Figure 7:
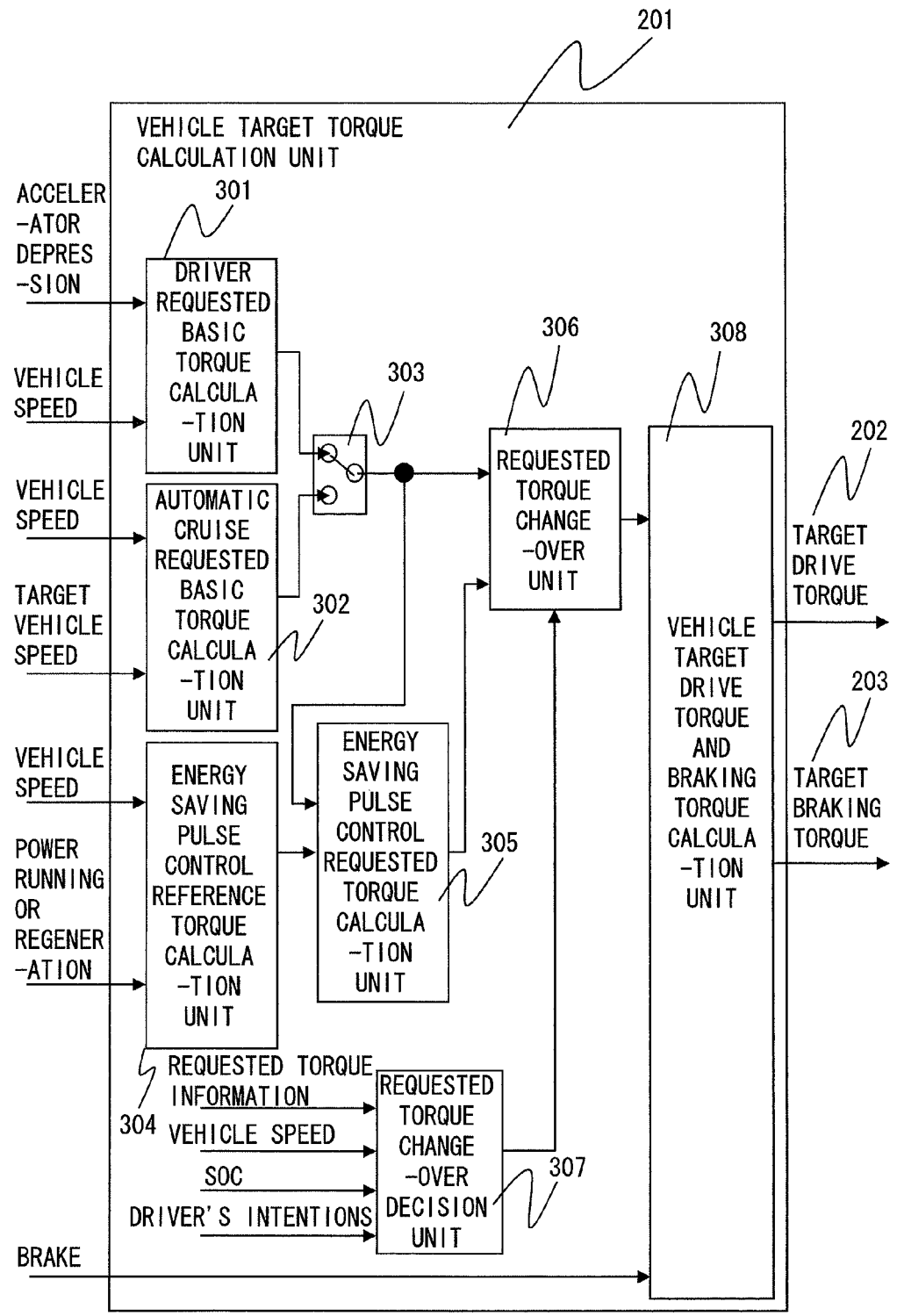
FIG. 7 is a figure showing details of calculation by a vehicle target torque calculation unit, in a first embodiment.

Next, the vehicle target torque calculation unit 201 will be explained with reference to FIG. 7. A driver requested basic torque calculation unit 301 calculates a driver requested basic torque on the basis of the accelerator pedal depression amount signal and the vehicle speed signal that have been inputted. And an automatic cruise requested basic torque calculation unit 302 calculates an automatic cruise requested basic torque on the basis of the difference between a target vehicle speed that has been set by the driver and the actual vehicle speed information in the vehicle running parameters. Moreover, a torque control/speed control changeover unit 303 changes over between torque control and speed control according to actuation of a selection switch by the driver. When torque control is selected by this changing over, in other words when running control by the accelerator pedal is selected, the driver requested basic torque that has been calculated by the driver requested basic torque calculation unit 301 is selected. But when speed control is selected, in other words when running control by auto cruise is selected, the automatic cruise requested basic torque that has been calculated by the automatic cruise requested basic torque calculation unit 302 is selected. In the following explanation, it will be supposed that torque control has been selected.

An energy saving pulse control reference torque calculation unit 304 calculates an energy saving pulse control reference torque on the basis of the vehicle speed and on the basis of information relating to the drive state of the motor (i.e. whether it is providing power running or performing regeneration). And an energy saving pulse control requested torque calculation unit 305 calculates an energy saving pulse control requested torque on the basis of the basic torque (in this embodiment, the driver requested basic torque) that has been selected by the torque control/speed control changeover unit 303 and the energy saving pulse control reference torque.

According to the result of decision by a requested torque changeover decision unit 307 that will be described hereinafter, the requested torque changeover unit 306 selects one of the basic torque and the energy saving pulse control requested torque described above. The requested torque changeover decision unit 307 determines which of the basic torque and the energy saving pulse control requested torque described above is to be selected, on the basis of information such as the requested torque information, the vehicle speed and the amount of electricity stored in the battery (i.e. the battery SOC), the intention of the driver in relation to mode selection, and so on.

And, at the last stage, the vehicle target drive torque and braking torque calculation unit 308 calculates the target drive torque 202 and the target braking torque 203 to be taken as targets for the vehicle on the basis of the requested torque that is selected by the requested torque changeover unit 306 and the amount by which the brake pedal is being stepped upon. And the vehicle target drive torque and braking torque calculation unit 308 outputs the target drive torque 202 and the target braking torque 203 that have thus been calculated to the target motor braking/driving torque calculation unit 205 and to the regeneration and braking torque coordination calculation unit 204, respectively.

Figure 8:
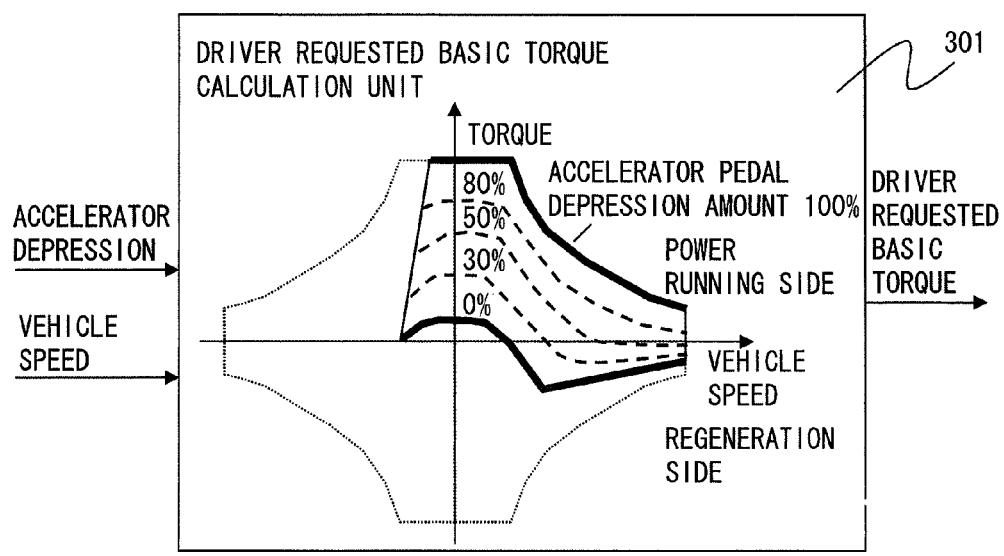
FIG. 8 is a figure showing details of calculation by a driver requested basic torque calculation unit.

Next, the details of the driver requested basic torque calculation unit 301 will be explained with reference to FIG. 8. The driver requested basic torque calculation unit 301 includes a calculation map that takes the accelerator pedal depression amount and the vehicle speed as input parameters, and refers to this calculation map and calculates the driver requested basic torque value on the basis of the accelerator pedal depression amount and the vehicle speed. When the accelerator pedal is fully depressed, the torque at the upper limit of the map region is calculated as the driver requested basic torque value, and, when the accelerator pedal is completely released, the torque at the lower limit of the map region is calculated as the driver requested basic torque value. And, when the accelerator pedal depression amount is an opening amount between fully depressed and completely released, a value between these upper and lower limits of the map region that corresponds to this opening amount is calculated as the driver requested basic torque value. In order to provide a match with the characteristics of a vehicle equipped with an internal combustion engine, when the accelerator pedal is completely released and moreover the vehicle speed is low, a positive torque, which is taken as corresponding to creep torque, on the power running side is calculated as the driver requested basic torque value; while, when the accelerator pedal is completely released and moreover the vehicle speed is medium or high, a negative torque, which is taken as corresponding to engine braking, on the regeneration side is calculated as the driver requested basic torque value.

Figure 9:
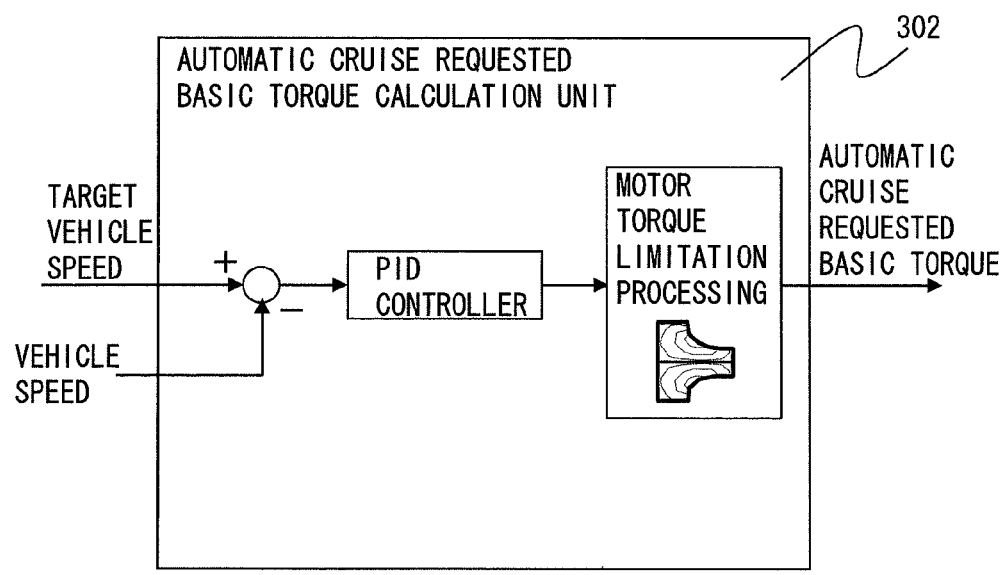
FIG. 9 is a figure showing details of calculation by an automatic cruise requested basic torque calculation unit.

Next, the details of the processing for calculating the automatic cruise requested basic torque outputted by the automatic cruise requested basic torque calculation unit 302 will be explained with reference to FIG. 9. A PID controller is fitted to the automatic cruise requested basic torque calculation unit 302, and the automatic cruise requested basic torque calculation unit 302 calculates the necessary torque for maintaining the target vehicle speed with this PID controller, on the basis of the difference between the target vehicle speed set by the driver and the actual vehicle speed. In order for the necessary torque for maintaining the target vehicle speed not to be exceeded the range in which the motor torque can be implemented, motor torque limitation processing is performed at a stage after the output of the PID controller. As described above, in this embodiment, it is supposed that the automatic cruise requested basic torque is not selected by the torque control/speed control changeover unit 303.

Figure 10:
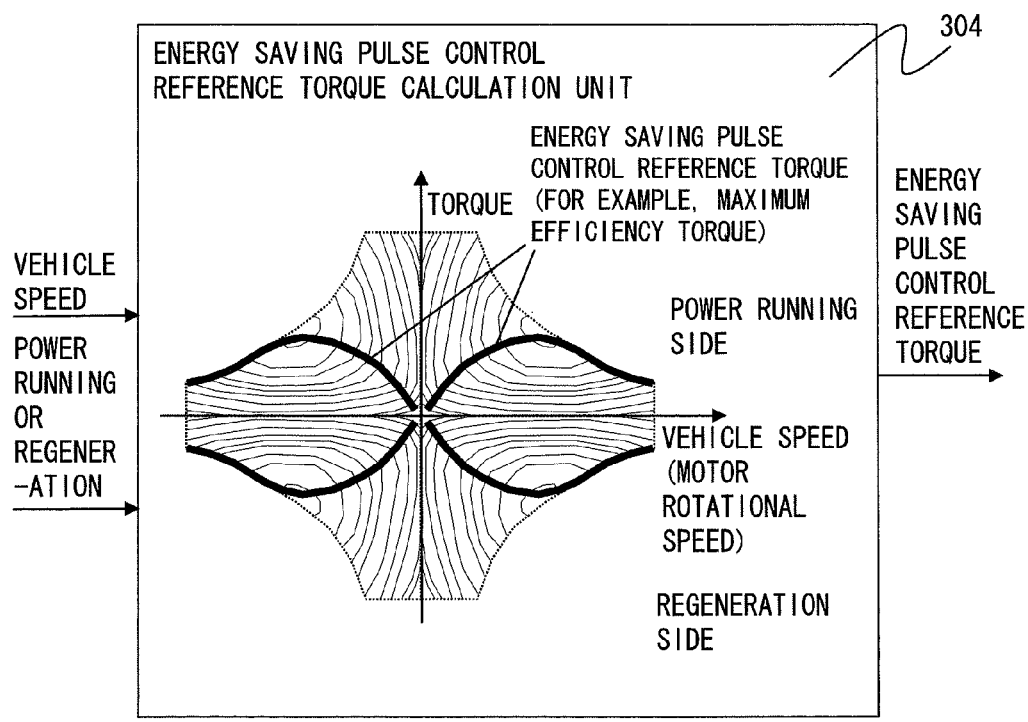
FIG. 10 is a figure showing details of calculation by an energy saving pulse control reference torque calculation unit.

Next, the details of the processing for calculating the energy saving pulse control reference torque outputted by the energy saving pulse control reference torque calculation unit 304 will be explained with reference to FIG. 10. As shown in the figure, the drive efficiency of the motor follows a distribution, and the torque yielding maximum efficiency value is different for each vehicle speed and the corresponding motor rotational speed. A map for energy saving pulse control reference torque calculation is stored in the energy saving pulse control reference calculation unit 304, for example delimited by lines of torque yielding maximum efficiency, the subject being four quadrants determined by positive and negative values of torque and vehicle speed. A negative vehicle speed results from operation in reverse gear or from rolling backwards down a slope. A positive torque is obtained during power running, and a negative torque is obtained during regeneration. The energy saving pulse control reference torque calculation unit 304 calculates the energy saving pulse control reference torque on the basis of information about the positive and negative vehicle speed and torque, and by referring to this map for energy saving pulse control reference torque calculation.

Figure 11:
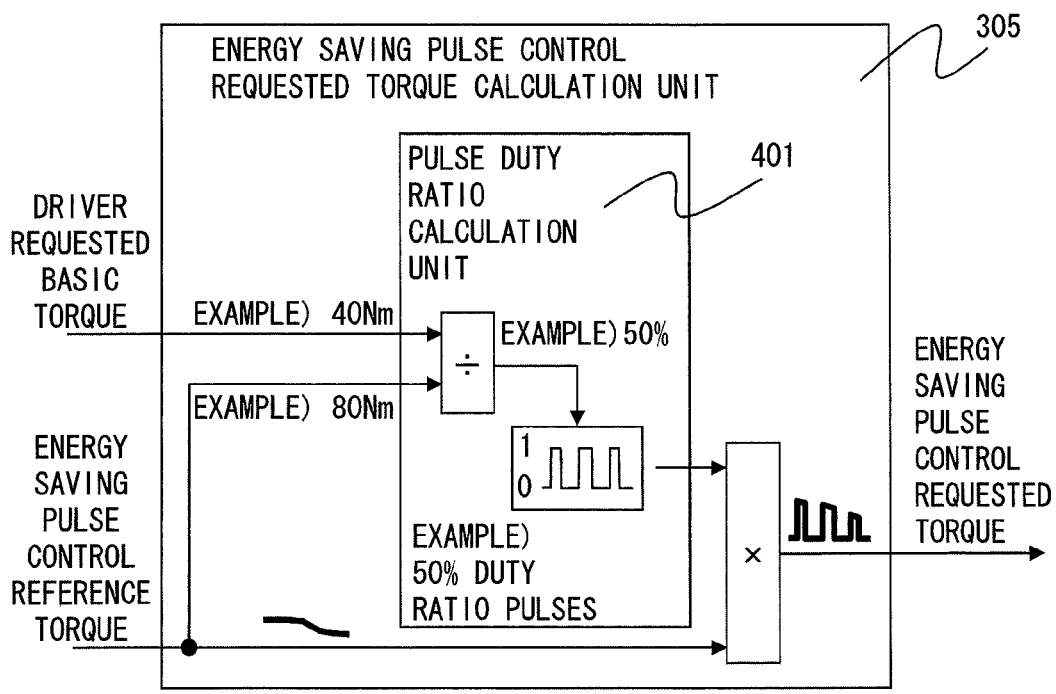
FIG. 11 is another figure showing details of calculation by this energy saving pulse control requested torque calculation unit.

Next, the details of the processing for calculating the energy saving pulse control requested torque outputted by the energy saving pulse control requested torque calculation unit 305 will be explained with reference to FIG. 11. When the driver requested basic torque and the energy saving pulse control reference torque are inputted, the energy saving pulse control requested torque calculation unit 305 calculates the energy saving pulse control requested torque by PWM processing based on the energy saving pulse control reference torque. The pulse duty ratio of this PWM processing (i.e. the allocation of its intervals) is given by the ratio between the driver requested basic torque and the energy saving pulse control reference torque. In other words, the pulse duty ratio calculation unit 401 obtains the pulse duty ratio by performing a calculation using the following Equation (2):

$$\text{pulse duty ratio} = \text{driver requested basic torque} \div \text{energy saving pulse control reference torque} \quad (2)$$

For example, if the driver requested basic torque is 40 Nm and moreover the energy saving pulse control reference torque is 80 Nm, then the pulse duty ratio becomes 50%, and a torque in pulse form that satisfies the pulse duty ratio obtained in this manner is outputted by the energy saving pulse control requested torque calculation unit 305 as the energy saving pulse control requested torque.

It should be understood that if the condition "pulse duty ratio≤100%", in other words the condition "driver requested basic torque≤energy saving pulse control reference torque" is satisfied, then the requested torque changeover decision unit 307 that will be described hereinafter selects the energy saving pulse control requested torque as the final requested torque. But, if the condition described above is not satisfied, then the requested torque changeover decision unit 307 selects the driver requested basic torque as the final requested torque.

Figure 12:
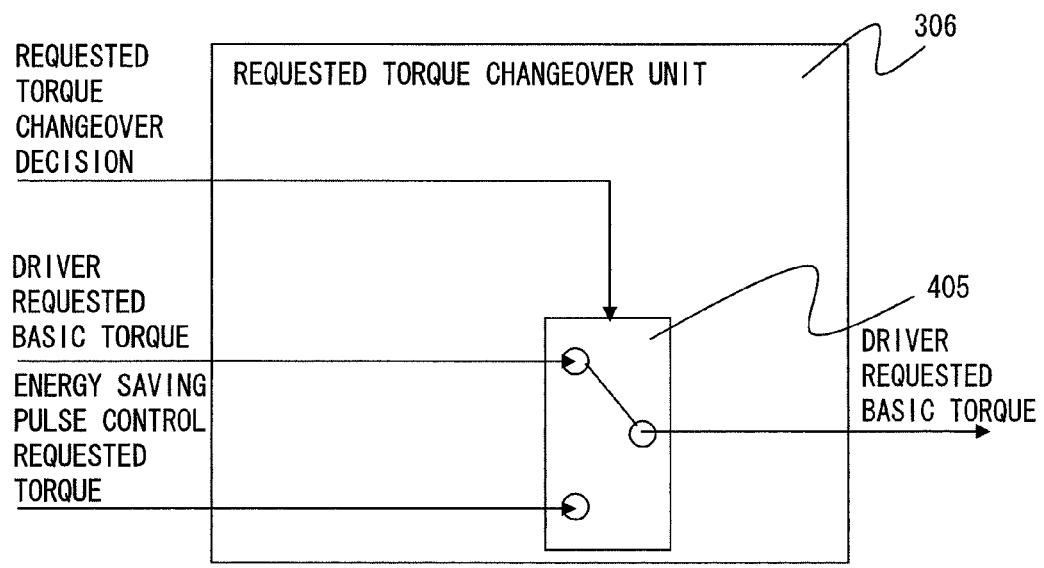
FIG. 12 is a figure showing details of calculation by a requested torque changeover unit.
Figure 13:
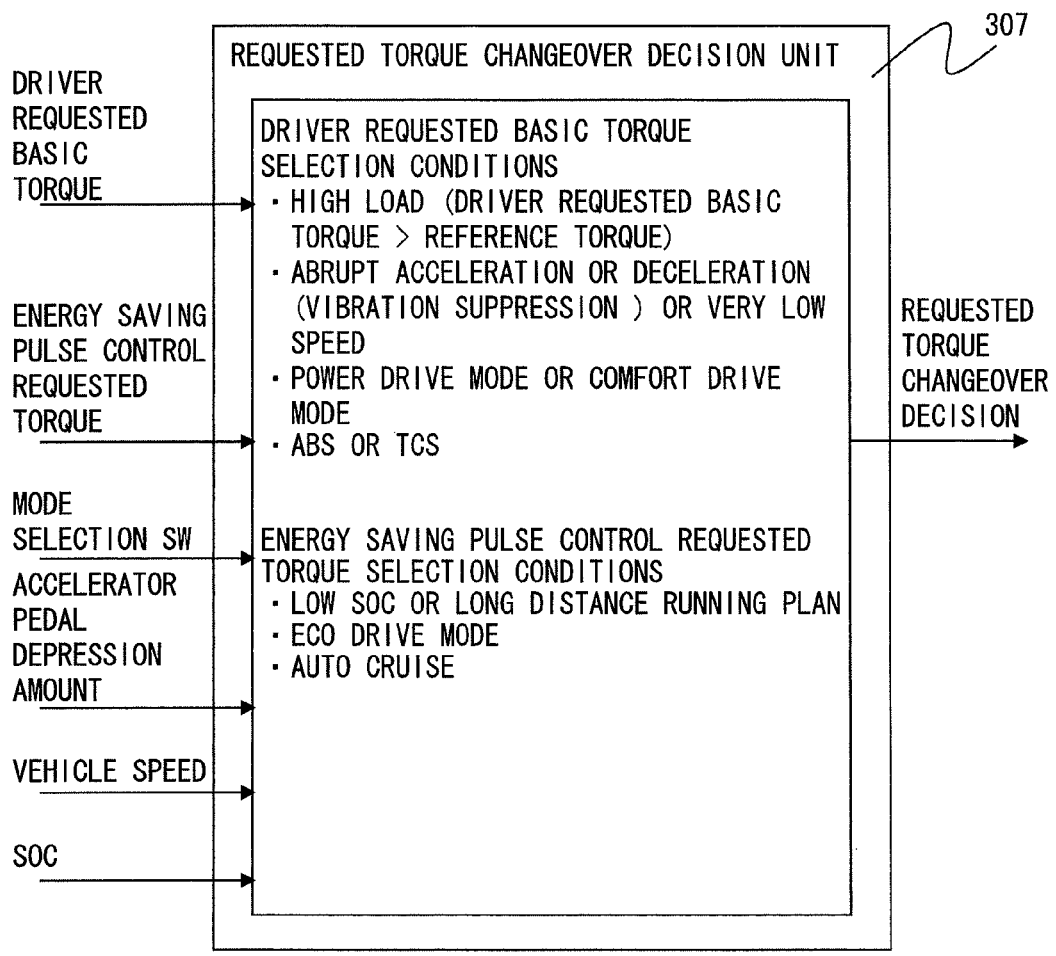
FIG. 13 is a figure showing details of calculation by a requested torque changeover decision unit.

Next, the details of the requested torque changeover unit 306 and of the requested torque changeover decision unit 307 will be explained with reference to FIGS. 12 and 13. The requested torque changeover decision unit 307 shown in FIG. 13 determines which one of the driver requested basic torque and the energy saving pulse control requested torque is to be selected as the final requested torque, on the basis of the driver requested basic torque, the energy saving pulse control reference torque, the input from a mode selection SW (switch) such as eco mode or power mode or the like, the accelerator pedal depression amount, the vehicle speed, the battery SOC (i.e. the remaining amount in the battery), and so on. A selector 405 incorporated in the requested torque changeover unit 306 implements changeover of the requested torque according to the determination by the requested torque changeover decision unit 307. FIG. 12 shows an example in which the driver requested basic torque is selected and is outputted from the requested torque changeover unit 306.

In consideration of the fact that, in principle, energy saving pulse control can be applied only when the requested torque is lower than the maximum efficiency torque, and of the fact that, since it is pulse control, such energy saving pulse control is comparatively better applicable to torque control that is not extremely accurate, as a concrete decision standard, the requested torque changeover decision unit 307 performs the decision on the basis of the following conditions.

Figure 14:
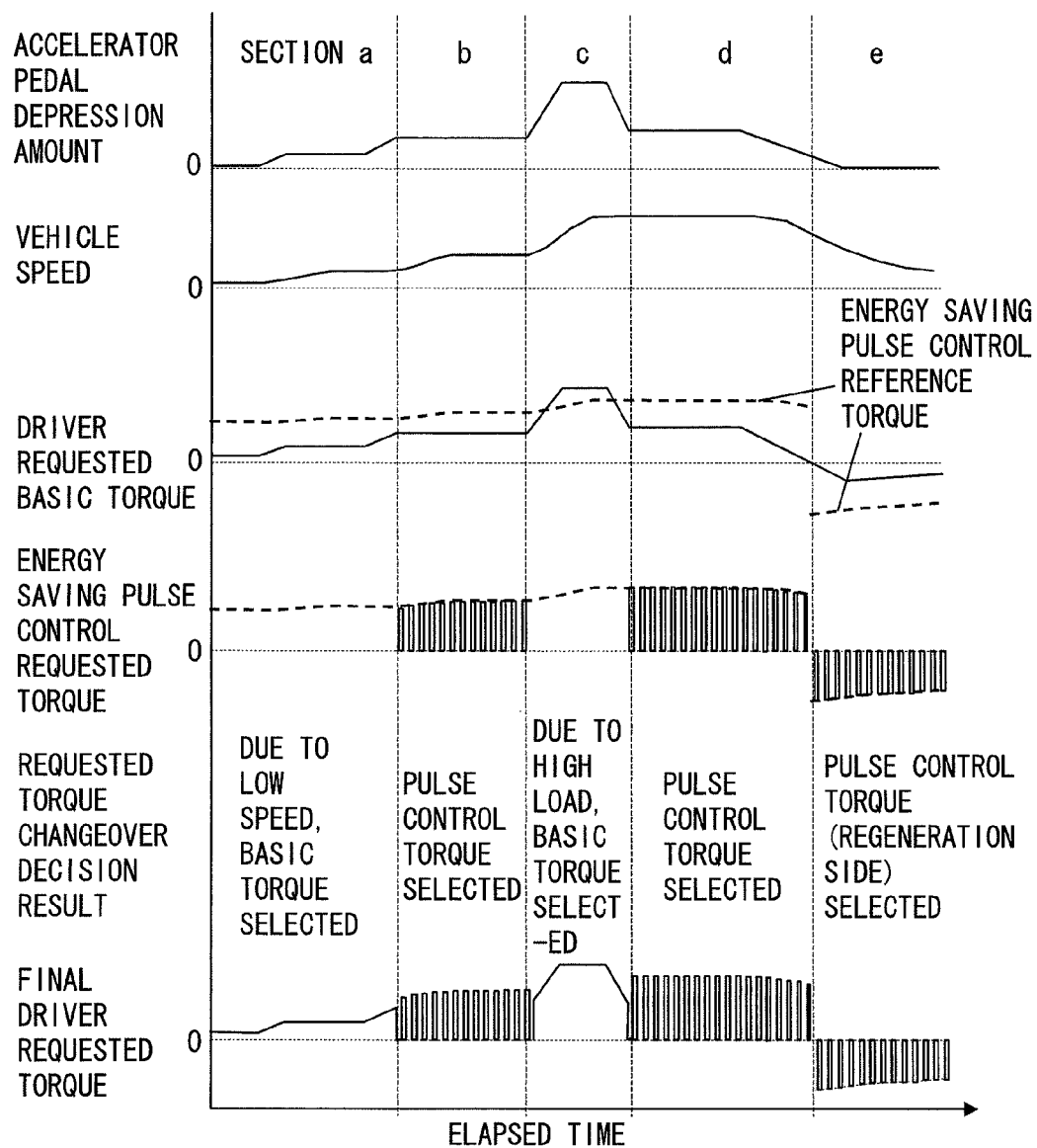
FIG. 14 is a time chart for requested torque selection processing.

(A) Driver Requested Basic Torque Selection Conditions
 During high load (the driver requested basic torque>the energy saving pulse control reference torque)
 During abrupt acceleration or deceleration (vibration suppression) or at very low speed
 During power mode running or comfort drive mode running
 During ABS operation or during TCS operation (B) Energy Saving Pulse Control Selection Conditions
 During a low SOC state or when long distance running is planned.
 During eco drive mode running
 When auto cruise is selected Next, a time chart for the requested torque selection processing performed by the requested torque changeover decision unit 307 is shown with reference to FIG. 14.

(Section a) Section a is an interval from when the vehicle is stopped until it starts off from rest, and, in order for delicate torque actuation to be obtained with the accelerator pedal, the requested torque changeover decision unit 307 selects the driver requested basic torque, for which the torque controllability is excellent. The motor 104 is continuously drive controlled according to the driver requested basic torque.

(Section b) Section b is an interval of steady running at low load, and, since the condition "driver requested basic torque≤energy saving pulse control reference torque" is satisfied, accordingly the torque changeover decision unit 307 selects the energy saving pulse control requested torque which provides a beneficial effect with regard to power consumption, in consideration of economy. The motor 104 is intermittently drive controlled with the energy saving pulse control requested torque.

(Section c) Section c is a section of acceleration due to overtaking or the like in which a high responsiveness is demanded, and moreover the driver requested basic torque is greater than the energy saving pulse control reference torque. Due to this, the condition that is satisfied in section b is not satisfied in this section c. The requested torque changeover decision unit 307 selects the driver requested basic torque, and not the energy saving pulse control requested torque. And the motor 104 is continuously drive controlled according to this driver requested basic torque.

(Section d) Section d is an interval in which low load steady running is returned to and thereafter a transition to deceleration is executed by releasing the accelerator pedal. Since the condition "driver requested basic torque≤energy saving pulse control reference torque" is satisfied, accordingly the torque changeover decision unit 307 selects the energy saving pulse control requested torque which provides a beneficial effect with regard to power consumption, in consideration of economy. The motor 104 is intermittently drive controlled with the energy saving pulse control requested torque.

(Section e) Section e is an interval in which, along with the driver releasing the accelerator pedal, a negative torque (i.e. a regeneration torque) that corresponds to engine braking is generated. Since the condition "|driver requested basic torque|≤|energy saving pulse control reference torque|" is satisfied, accordingly the torque changeover decision unit 307 selects the energy saving pulse control requested torque which provides a beneficial effect with regard to power consumption, in consideration of economy. The motor 104 is intermittently drive controlled with the energy saving pulse control requested torque.

In the running control by the braking/driving ECU 102 according to this embodiment, since the effective output of the drive motor is adjusted with the pulse duty ratio, accordingly it is possible to use only the maximum efficiency torque when driving the motor, irrespective of the running load. The torque changeover decision unit 307 implements appropriate changeover between the driver requested basic torque and the energy saving pulse control requested torque on the basis of the vehicle speed and the load information and so on. Accordingly, the running control by the braking/driving ECU 102 of this embodiment becomes superlative with regard to drivability and comfort, and, as compared to the continuous motor drive control of the prior art, a very great beneficial effect (a beneficial effect with regard to power consumption or power consumption advantage) is obtained in terms of reduction of the power consumption, and accordingly it is possible to obtain the advantages of increasing the range of the electric vehicle and of reducing the size of the battery that is fitted thereto.

Figure 15:
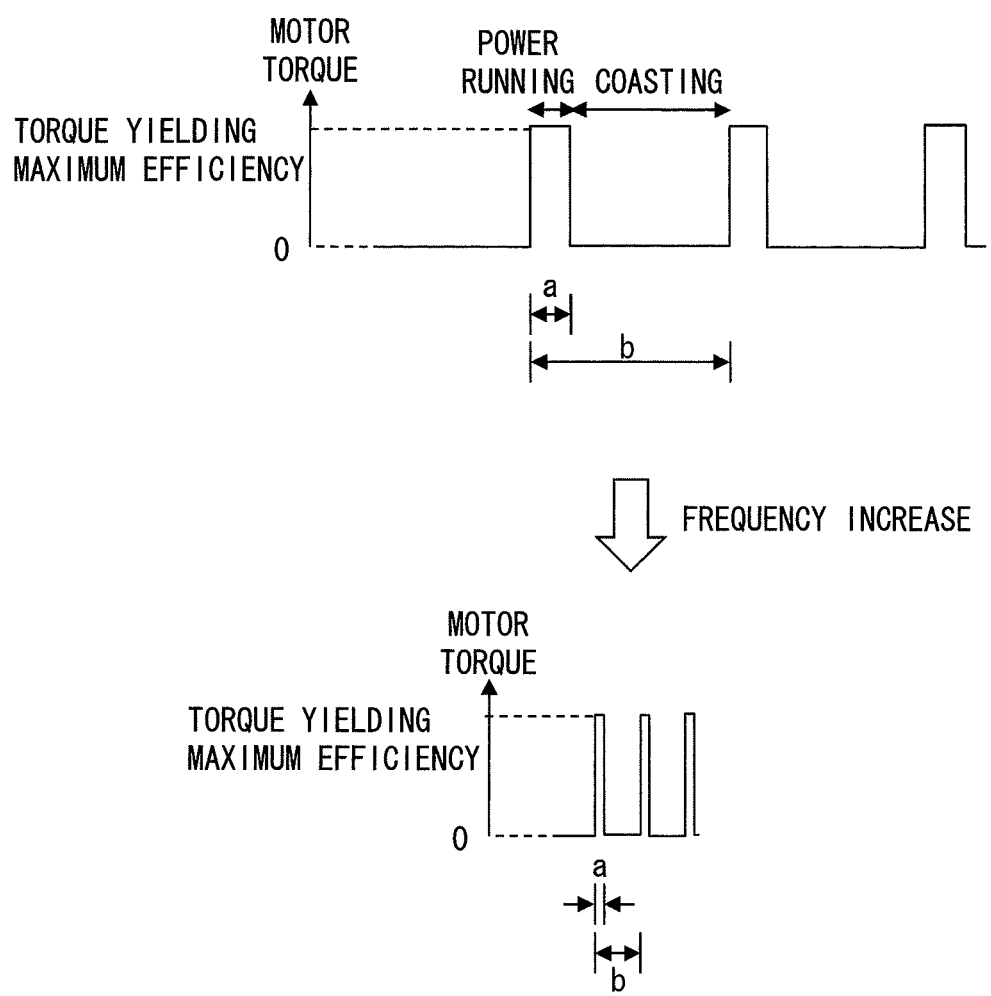
FIG. 15 is a figure showing details of pulse control.

As shown in FIG. 15, by shortening the period of the torque pulses according to the pulse form torque control shown in FIG. 3A and thus increasing the frequency, it is possible to perform adjustment for the drivability and the riding feeling, so that the driver and the passengers in the vehicle do not experience any feeling of discomfort. Drivability is founded upon torque responsiveness. When the response time period is long, the driver experiences a feeling of discomfort. The torque responsiveness depends upon the period of the torque pulses. The riding feeling also is founded upon the period of the torque pulses. When the period of the torque pulses is shorter than a predetermined period, the driver and the passengers in the vehicle perceive almost no vibration, but when the period of the torque pulses is greater than the predetermined period, the driver and the passengers experience vibration and feel a sensation of discomfort in terms of the riding feeling. In concrete terms, in consideration of the torque responsiveness of the motor and the torque resolution during PWM, it is desirable for the pulse period to be ≤500 ms and for the minimum pulse width to be ≤5 ms, although these values should be adjusted according to experiment.

The braking/driving ECU 102 according to the first embodiment provides the following beneficial operational effects.

(1) The braking/driving ECU 102 includes the energy saving pulse control reference torque calculation unit 304 and the energy saving pulse control requested torque calculation unit 305. The energy saving pulse control reference torque calculation unit 304 calculates the energy saving pulse control reference torque that is needed for braking or driving the motor 104 providing a beneficial effect with regard to the power consumption of the electric vehicle 101, on the basis of the actual speed of the electric vehicle 101 and of the operational state, of the motor 104 of the electric vehicle 101, which is related to power running or regeneration. And the energy saving pulse control requested torque calculation unit 305 calculates the interval allocation between the intervals in which the electric vehicle is propelled by braking or driving the motor 104 with the energy saving pulse control reference torque, and the intervals in which the electric vehicle 101 is coasted without the motor 104 performing either braking or driving, on the basis of the actual vehicle speed and the accelerator pedal depression amount. And the energy saving pulse control requested torque calculation unit 305 calculates the energy saving pulse control requested torque in order to brake or drive the motor 104 intermittently, so as repeatedly to alternate running and coasting of the electric vehicle 101. Moreover, the target motor braking/driving torque calculation unit 205 performs running control of the electric vehicle 101 by intermittently braking or driving (braking/driving) the motor 104 according to this energy saving pulse control requested torque. Accordingly, as compared to the continuous motor drive control of the prior art, the intermittent motor braking and driving control performed by the braking/driving ECU 102 that is the running control device for the electric vehicle 101 in this embodiment is very high efficiency motor braking and driving control, so that a very great beneficial effect (a beneficial effect with regard to power consumption or power consumption benefit) is obtained with regard to reduction of power consumption, and it is possible also to implement the benefits of increasing the range of the electric vehicle and of reducing the size of the battery that is fitted thereto.

(2) The period at which the intervals of propelling the electric vehicle 101 by braking or driving the motor 104 at the energy saving pulse control reference torque, and the intervals of coasting the electric vehicle 101 without braking or driving the motor 104, are alternatingly repeated by the braking/driving ECU 102 is 500 ms or less. Accordingly, no discomfort is experienced by the driver or by the passengers in the vehicle with regard to drivability or riding feeling.

—Second Embodiment—

Figure 16:
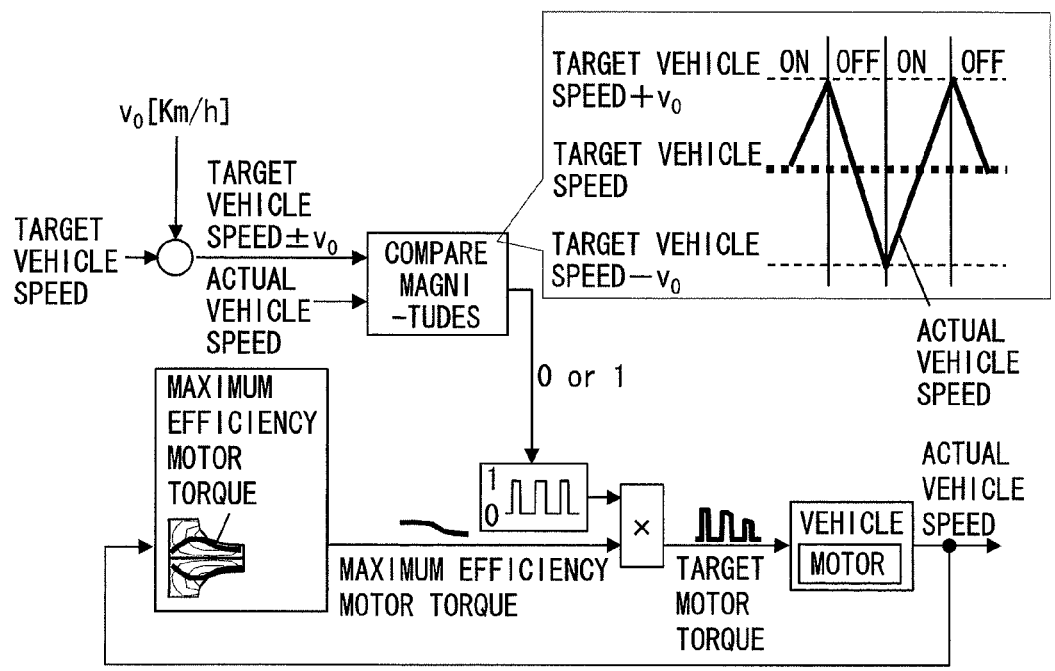
FIG. 16 is a figure showing details of high efficiency running control, in a second embodiment.

Next, running control performed by a braking/driving ECU 102 in a second embodiment of the present invention will be explained with reference to FIG. 16. FIG. 16 shows a control block diagram whose subject is constant speed running control by repeating acceleration and coasting. When a target vehicle speed is set by the driver, this target vehicle speed and the actual vehicle speed are inputted to the energy saving pulse control requested torque calculation unit 305 shown in FIG. 7. In other words, the energy saving pulse control requested torque calculation unit 305 calculates the energy saving pulse control requested torque using the target vehicle speed and the actual vehicle speed, instead of using the basic torque outputted by the driver requested basic torque calculation unit 301 or by the automatic cruise requested basic torque calculation unit 302. Acceleration control is repeatedly turned ON and OFF by the energy saving pulse control requested torque calculation unit 305, so that the actual vehicle speed is kept within $\pm v_0$ of the target vehicle speed [km/h]. This vehicle speed amount of variation $v_0$ is inputted by the driver to the energy saving pulse control requested torque calculation unit 305, or is set in advance in a memory, not shown in the figures, that is included in the energy saving pulse control requested torque calculation unit 305. In the latter case, it would also be acceptable to arrange for the vehicle speed amount of variation $v_0$ to be determined according to the target vehicle speed. Moreover, since the vehicle speed amount of variation $v_0$ also experiences some influence from the condition of the road surface and the topography, it would also be acceptable to calculate the vehicle speed amount of variation $v_0$ during a predetermined interval according to the condition of the road surface and/or the topography, by utilizing information from a navigation device, not shown in the figures, that is mounted to the electric vehicle 101, or the like.

The allocation of intervals to ON and OFF of the acceleration control is determined as will now be described. That is, when due to coasting the actual vehicle speed drops and reaches $v_0$ lower than the target vehicle speed (the target vehicle speed−$v_0$), then the torque pulse for the motor torque becomes 1, and the acceleration control is turned ON. But, when the actual vehicle speed increases and reaches $v_0$ higher than the target vehicle speed (the target vehicle speed+$v_0$), then the torque pulse for the motor torque becomes 0, and the acceleration control is turned OFF. As described in the explanation of the first embodiment, since the maximum efficiency motor torque (i.e. the energy saving pulse control reference torque) changes according to the motor rotational speed, accordingly, when the torque pulse for the motor torque becomes 1, the motor of the vehicle is driven with the maximum efficiency motor torque that corresponds to the motor rotational speed. And, when the torque pulse for the motor torque becomes 0, the motor of the vehicle is not driven. The actual speed for the vehicle is obtained by the motor of the vehicle being driven according to the target motor torque (the energy saving pulse control requested torque) that is determined by repeatedly turning the acceleration control ON and OFF in this manner, and the maximum efficiency motor torque that corresponds to the motor rotational speed at this time is used in calculation for determining the target motor torque for a next time.

This driving of the motor 104 of the vehicle according to the energy saving pulse control requested torque is performed when the energy saving pulse control selection condition is satisfied. But, when the driver requested basic torque selection condition is satisfied, the motor 104 of the vehicle is driven according to the basic torque outputted by the driver requested basic torque calculation unit 301 or by the automatic cruise requested basic torque calculation unit 302. The driver requested basic torque selection condition and the energy saving pulse control selection condition are respectively the same as in the first embodiment.

In the running control by the braking/driving ECU 102 according to this embodiment, since the maximum efficiency torque for each motor rotational speed is used as the motor torque value during acceleration, accordingly it becomes possible to enhance the drive efficiency of the motor, and low power consumption running becomes possible.

—Third Embodiment—

Next, running control performed by a braking/driving ECU 102 in a third embodiment of the present invention will be explained with reference to FIGS. 17 through 21. In this embodiment, for a driver requested virtual target vehicle speed that is calculated corresponding to normal running control according to actuation of the accelerator pedal by the driver, acceleration control is repeatedly turned ON and OFF, so that the actual vehicle speed is kept within ±v0 [km/h] of the driver requested virtual target vehicle speed.

In concrete terms the braking/driving ECU 102, along with calculating the motor torque requested by the driver on the basis of the accelerator pedal depression amount and the vehicle speed, also inputs a motor torque to a simulation of the power characteristics of the electric vehicle with a vehicle model, and calculates a driver requested virtual target vehicle speed that is virtually requested by the driver. A calculation equation that specifies the vehicle model is stored in a memory, not shown in the figures, that is included in the braking/driving ECU 102. For the driver requested virtual target vehicle speed that has been calculated in this manner, by performing running control while repeatedly allocating intervals for acceleration and coasting so as to keep the actual vehicle speed within ±v0 [km/h] of the driver requested virtual target vehicle speed in a similar manner to that explained for the second embodiment using FIG. 16, it becomes possible to implement low power running control corresponding to the amount of actuation of the accelerator pedal.

Figure 18:
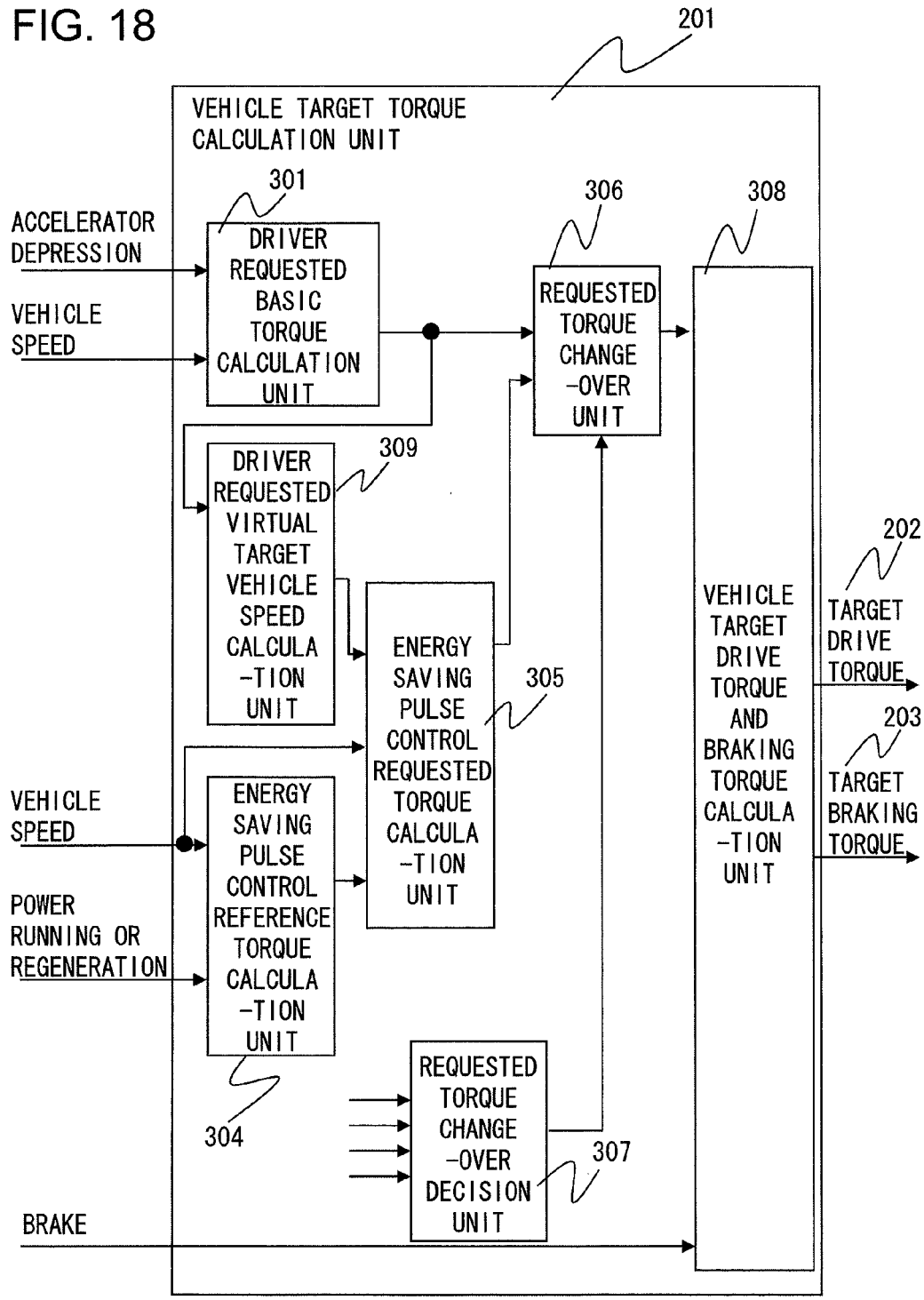
FIG. 18 is a figure showing details of calculation by a vehicle target torque calculation unit, in the third embodiment.

Next, the details of the vehicle target torque calculation unit 201 incorporated in the braking/driving ECU 102 in this third embodiment will be explained with reference to FIG. 18. Since the details of the driver requested basic torque calculation unit 301, the energy saving pulse control reference torque calculation unit 304, the requested torque changeover unit 306, the requested torque changeover decision unit 307, and the vehicle target drive torque and braking torque calculation unit 308 are the same as in the case of the first embodiment, accordingly explanation thereof will be omitted. However, the details of a driver requested virtual target vehicle speed calculation unit 309 and of the energy saving pulse control requested torque calculation unit 305 will be explained below.

Figure 19:
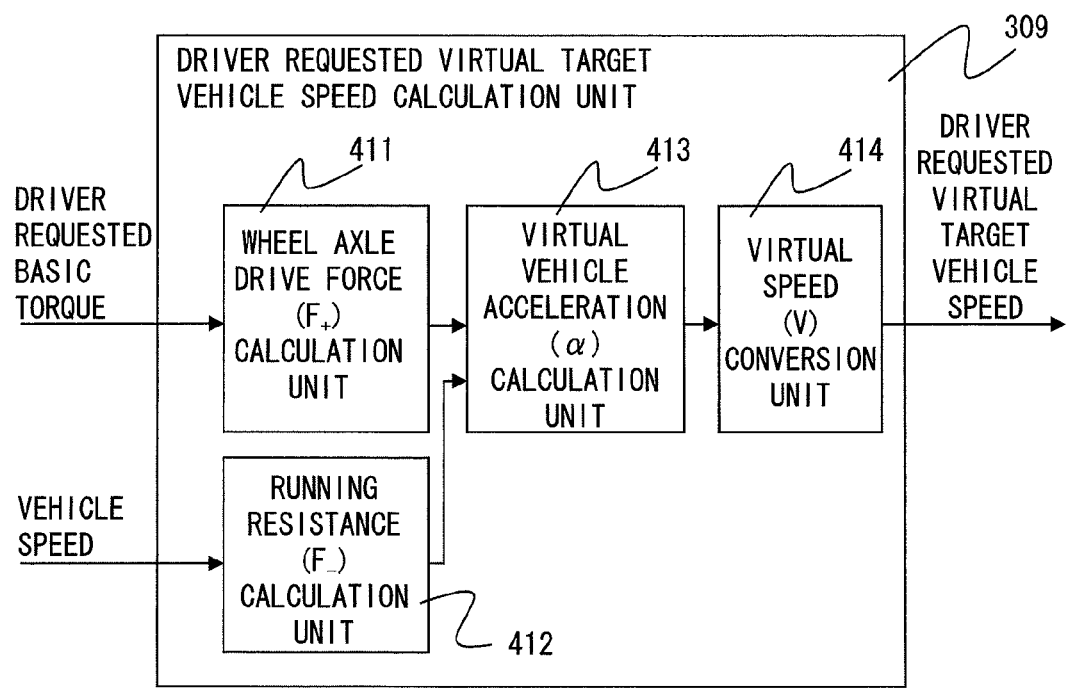
FIG. 19 is a figure showing the details of calculation by a driver requested virtual target vehicle speed calculation unit, in the third embodiment.

FIG. 19 shows the details of the driver requested virtual target vehicle speed calculation unit 309. A wheel axle drive force calculation unit 411, a running resistance calculation unit 412, a virtual vehicle acceleration calculation unit 413, and a virtual speed conversion unit 414 are included within this driver requested virtual target vehicle speed calculation unit 309, and the driver requested virtual target vehicle speed is finally calculated using these calculation units. The wheel axle drive force calculation unit 411 calculates the wheel axle drive force $F_+$ on the basis of the driver requested basic torque, and in consideration of the deceleration ratio and the tire radius. And the running resistance calculation unit 412 calculates the rolling resistance and the air resistance on the basis of the vehicle speed by referring to a table stored in a memory not shown in the figures, and calculates the vehicle total running resistance $F_-$. Then, on the basis of the vehicle weight m, the wheel axle drive force $F_+$, and the running resistance $F_-$, the virtual vehicle acceleration calculation unit 413 calculates the virtual vehicle acceleration a by using Equation (3) described below.

$$\alpha = (F_+ - F_-)/m \qquad (3)$$

And the virtual speed conversion unit 414 calculates the driver requested virtual target vehicle speed V by using Equation (4) described below:

$$V = \int \alpha \, dt = \int (F_+ - F_-)/m \, dt \qquad (4)$$

Figure 20:
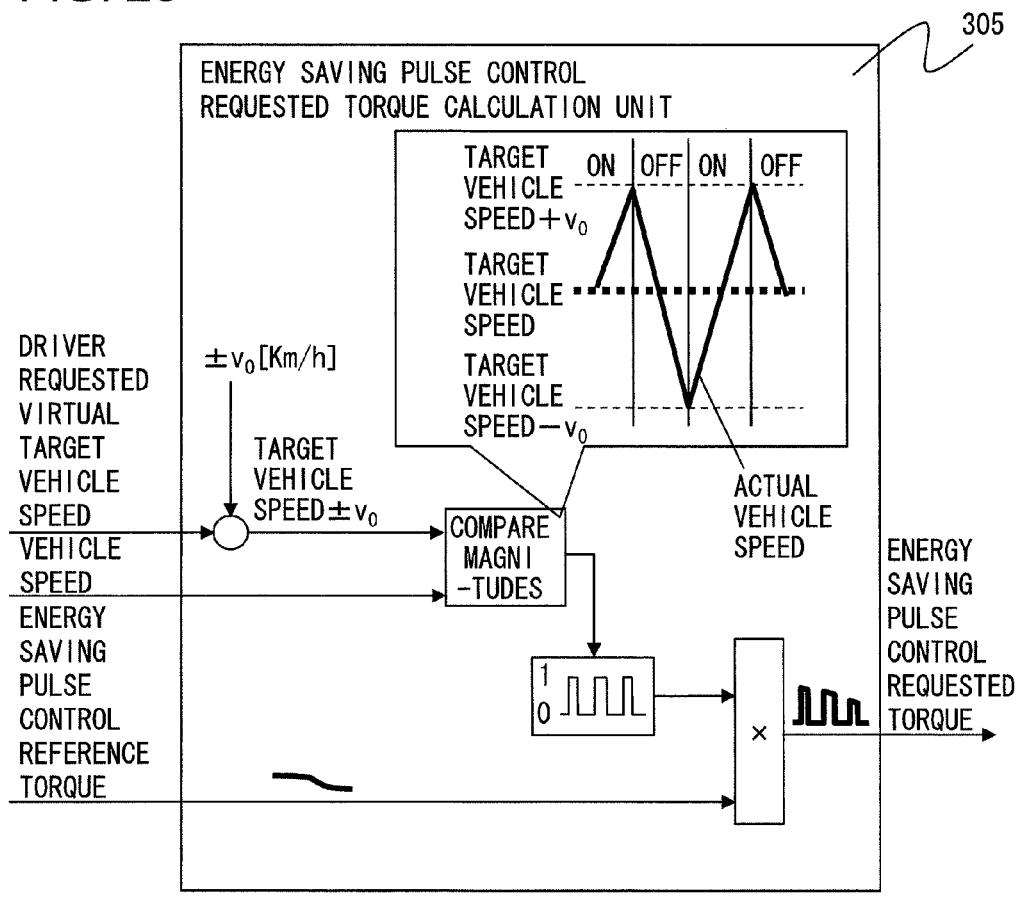
FIG. 20 is a figure showing details of calculation by an energy saving pulse control requested torque calculation unit, in the third embodiment.

Next, the details of calculation by the energy saving pulse control requested torque calculation unit 305 included in the braking/driving ECU 102 according to the third embodiment will be explained with reference to FIG. 20. The main parameter that is inputted to the energy saving pulse control requested torque calculation unit 305 is the energy saving pulse reference torque calculated by the energy saving pulse control reference torque calculation unit 304, and for example may be the maximum efficiency motor torque. The energy saving pulse control requested torque calculation unit 305 implements ON/OFF pulse modulation upon the energy saving pulse reference torque, on the basis of the magnitude relationship between the driver virtual target vehicle speed and the actual vehicle speed. To explain the details, a permitted width of $\pm v_0$ [km/h] is provided for the target vehicle speed, and, when a first condition "$v_0$ higher than the target vehicle speed (target vehicle speed+$v_0$)<vehicle speed" is satisfied, the pulse is kept OFF, and acceleration control is kept OFF until a second condition "$v_0$ lower than the target vehicle speed (target vehicle speed−$v_0$)>vehicle speed" is satisfied. But, when the second condition is satisfied, the pulse goes to ON, and acceleration control is kept ON until the first condition is satisfied.

Figure 17:
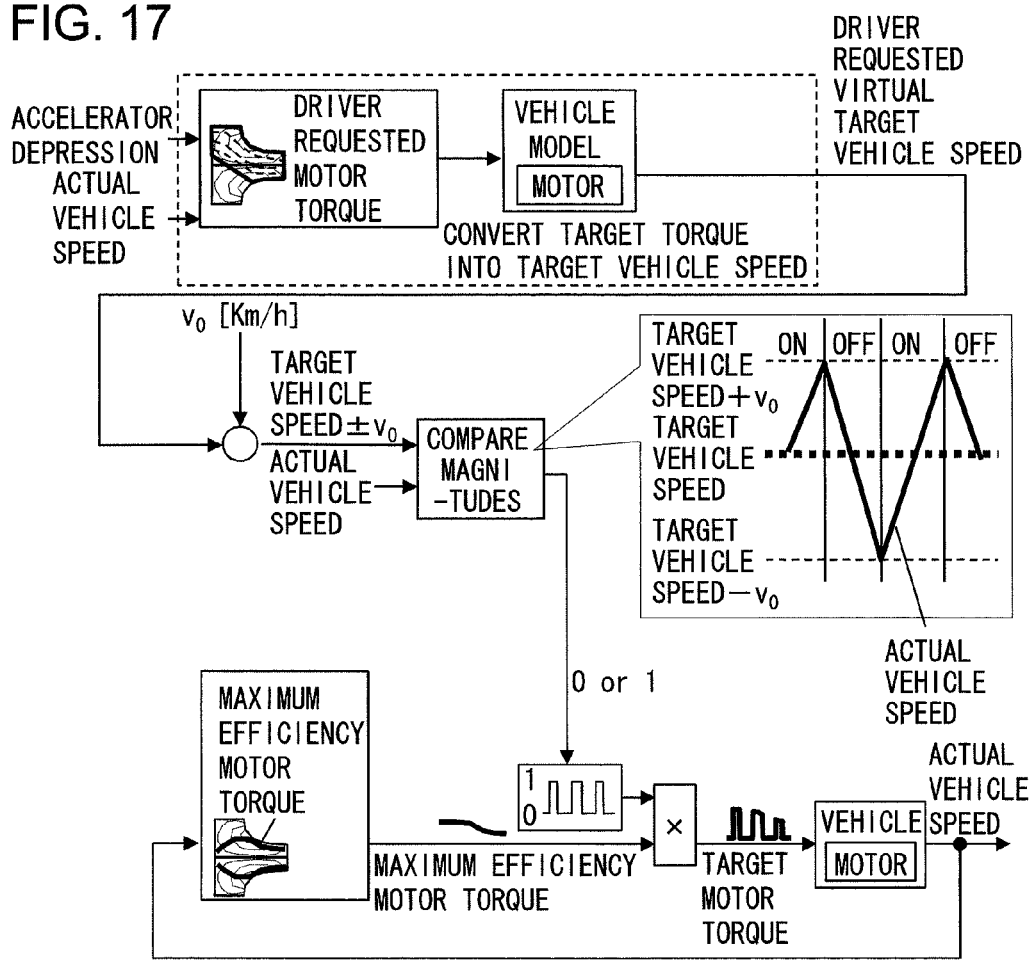
FIG. 17 is a figure showing details of high efficiency running control, in a third embodiment.

Since the energy saving pulse control reference torque (for example, the maximum efficiency motor torque) changes according to the motor rotational speed, accordingly, when the torque pulse of the motor torque is 1, the motor of the vehicle is driven with the energy saving pulse control reference torque that corresponds to the motor rotational speed. But when the torque pulse of the motor torque is 0, the motor of the vehicle is not driven. By repeatedly turning the acceleration control ON and OFF in this manner, as shown in FIG. 20, the energy saving pulse control requested torque outputted by the energy saving pulse control requested torque calculation unit 305 is determined. The actual vehicle speed of the vehicle is obtained by driving the motor of the vehicle according to the energy saving pulse control requested torque, and the maximum efficiency motor torque corresponding to the motor rotational speed at this time, in other words the energy saving pulse control reference torque, is used in the calculation for determining for a next time the target motor torque, in other words the energy saving pulse control requested torque, as shown in FIG. 17.

This driving of the motor 104 of the vehicle according to the energy saving pulse control requested torque is performed when the energy saving pulse control selection condition is satisfied. But if the driver requested basic torque selection condition is satisfied, then the motor 104 of the vehicle is driven according to the basic torque that is outputted by the driver requested basic torque calculation unit 301 or by the automatic cruise requested basic torque calculation unit 302. The driver requested basic torque selection condition and the energy saving pulse control selection condition are the same as for the first and the second embodiments.

Since in this embodiment the acceleration control is repeatedly turned ON and OFF during running control by the braking/driving ECU 102, it is possible for low power consumption running control to be implemented.

—Variations—

In the various embodiments described above, it is possible to perform adjustment in relation to the drivability and the riding feeling described above that accompany the pulse form torque, so that the driver and the passengers in the vehicle do not experience any feeling of discomfort. This type of adjustment may be implemented by the energy saving pulse control requested torque calculation unit 305 applying any of three types of modulation processing, i.e. ramp processing, sine wave processing, or flattening processing, to the torque pulses shown in FIG. 21A.

Figure 21A:
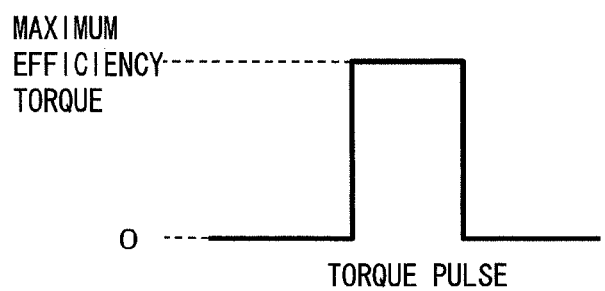
FIGS. 21A, 21B, 21C and 21D are figures showing details of pulse control.
Figure 21B:
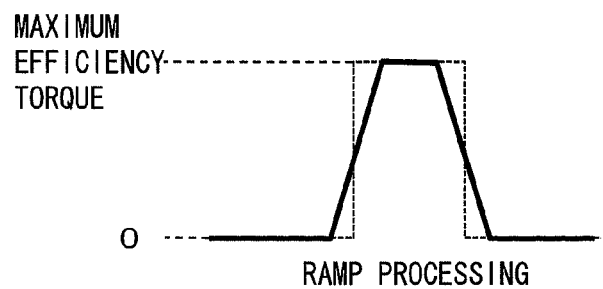
Figure 21C:
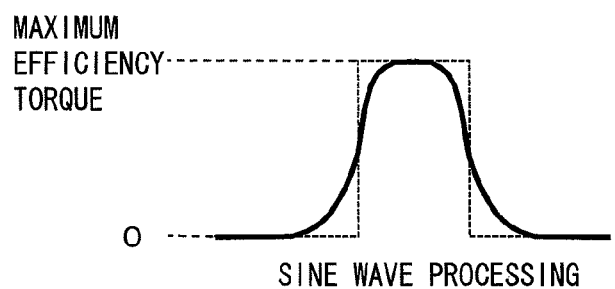
Figure 21D:
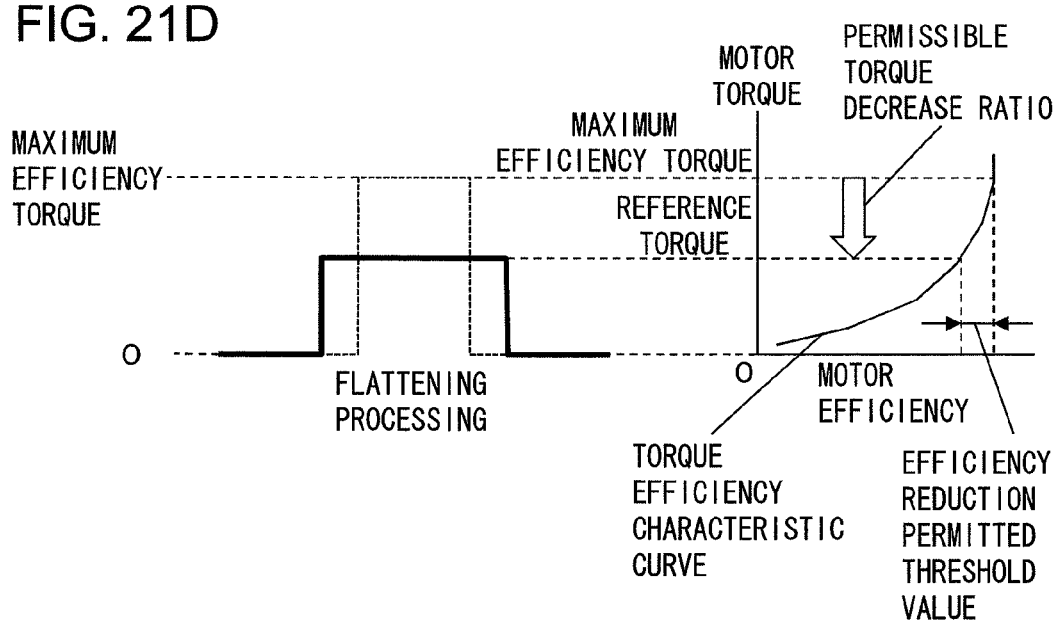

Ramp processing is processing for setting the changes during rising and falling of the torque to a ramped form, as shown in FIG. 21B. And sine wave processing is processing for setting the changes during rising and falling of the torque to the form of sine waves, as shown in FIG. 21C. Moreover, flattening processing is processing for setting the reference torque to lower than the maximum efficiency torque, as shown in FIG. 21D. At this time, the reference torque is set in consideration of the torque efficiency characteristic curve, within a range of permissible torque decrease ratio that is based upon an efficiency decrease permitted threshold value. FIG. 21D shows an example in which the reference torque is set on the basis of the maximum value of the permissible torque decrease ratio. It is desirable to change the degree of processing performed upon the torque pulses according to the application scenario, within the range in which the beneficial effect upon power consumption corresponding to the difference between the reference torque, in other words the operation point of the motor, and the maximum efficiency torque becomes greater than or equal to a predetermined value on the basis of these three types of modulation processing.

The above described embodiments are examples, and various modifications can be made without departing from the scope of the invention.

What is claimed is:

1. A running control device for an electric vehicle, comprising:
    a first calculation unit that, based upon vehicle running parameters of the electric vehicle and a drive state, related to power running and regeneration, of a motor of the electric vehicle, calculates a predetermined reference torque required for braking/driving the motor that provides a beneficial effect with regard to power consumption of the electric vehicle;
    a second calculation unit that, based upon the vehicle running parameters, calculates a requested basic torque for continuously braking/driving the motor;
    a third calculation unit that acquires the requested basic torque calculated by the second calculation unit, acquires the predetermined reference torque calculated by the first calculation unit, calculates based upon the requested basic torque and the predetermined reference torque, a first interval in which the electric vehicle is propelled by braking/driving the motor at the predetermined reference torque and a second interval in which the electric vehicle is coasted without the motor being braked or driven and calculates interval allocation between the first interval and the second interval;
    a fourth calculation unit that calculates a control requested torque for braking/driving the motor intermittently based upon the predetermined reference torque and the interval allocation, so as alternatingly to repeat running of the electric vehicle in the first intervals and coasting of the electric vehicle in the second intervals; and
    a running control unit that performs running control of the electric vehicle by braking/driving the motor intermittently according to the control requested torque.

2. A running control device for an electric vehicle according to claim 1, wherein
    the vehicle running parameters include an actual speed of the electric vehicle.

3. A running control device for an electric vehicle according to claim 1, wherein
    the predetermined reference torque is included in a maximum efficiency torque neighborhood that corresponds to a maximum efficiency of the motor.

4. A running control device for an electric vehicle according to claim 1, wherein
    the interval allocation corresponds to a ratio between the first interval and the second interval; and
    the ratio between the first interval and the second interval is determined based upon a ratio between the requested basic torque and the predetermined reference torque.

5. A running control device for an electric vehicle according to claim 1, wherein:
    an absolute value of the predetermined reference torque is a higher torque value than an absolute value of the requested basic torque; and
    a motor efficiency when braking/driving the motor with the predetermined reference torque is higher than a motor efficiency when braking/driving the motor with the requested basic torque.

6. A running control device for an electric vehicle according to claim 1, wherein
    the period at which the first interval and the second interval are repeated cyclically is less than or equal to 500 ms.

7. A running control device for an electric vehicle comprising:
    a first calculation unit that, based upon vehicle running parameters of the electric vehicle and a drive state, related to power running and regeneration, of a motor of the electric vehicle, calculates a predetermined reference torque required for braking/driving the motor that provides a beneficial effect with regard to power consumption of the electric vehicle;
    a second calculation unit that acquires an actual vehicle speed for the electric vehicle, acquires a target vehicle speed for the electric vehicle based upon the actual vehicle speed, an amount of depression of an accelerator pedal of the electric vehicle, a weight of the electric vehicle, and a resistance while the electric vehicle is running, calculates, based upon the target vehicle speed and the actual vehicle speed, a first interval in which the electric vehicle is propelled by braking/driving the motor at the predetermined reference torque and a second interval in which the electric vehicle is coasted without the motor being braked or driven and calculates interval allocation between the first interval and the second interval;

a third calculation unit that calculates a control requested torque for braking/driving the motor intermittently based upon the predetermined reference torque and the interval allocation, so as alternatingly to repeat running of the electric vehicle in the first intervals and coasting of the electric vehicle in the second intervals; and a running control unit that performs running control of the electric vehicle by braking/driving the motor intermittently according to the control requested torque.

8. A running control device for an electric vehicle according to claim 7, wherein the vehicle running parameters include an actual speed of the electric vehicle.

9. A running control device for an electric vehicle according to claim 7, wherein the predetermined reference torque is included in a maximum efficiency torque neighborhood that corresponds to a maximum efficiency of the motor.

* * * * *